US012615174B2

(12) United States Patent
Afzal et al.

(10) Patent No.: US 12,615,174 B2
(45) Date of Patent: Apr. 28, 2026

(54) MULTI-GIGABIT PER SECOND FREQUENCY-SHIFT KEYING (FSK) TRANSCEIVER

(71) Applicant: The Regents of the University of California, Oakland, CA (US)

(72) Inventors: Hamidreza Afzal, Davis, CA (US); Omeed Momeni, Davis, CA (US); Cheng Li, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/840,838

(22) PCT Filed: Apr. 24, 2023

(86) PCT No.: PCT/US2023/066135
§ 371 (c)(1),
(2) Date: Aug. 22, 2024

(87) PCT Pub. No.: WO2023/205811
PCT Pub. Date: Oct. 26, 2023

(65) Prior Publication Data
US 2025/0184194 A1 Jun. 5, 2025

Related U.S. Application Data

(60) Provisional application No. 63/333,796, filed on Apr. 22, 2022.

(51) Int. Cl.
*H04L 27/152* (2006.01)
*H04L 27/227* (2006.01)
(52) U.S. Cl.
CPC ........ *H04L 27/152* (2013.01); *H04L 27/2276* (2013.01)

(58) Field of Classification Search
None
See application file for complete search history.

(56) References Cited

U.S. PATENT DOCUMENTS

| | | | | | |
|---|---|---|---|---|---|
| 2,930,991 | A | * | 3/1960 | Edwards | H04L 27/12 |
| | | | | | 334/56 |
| 3,045,191 | A | * | 7/1962 | Blanchard | H03B 5/24 |
| | | | | | 331/137 |

(Continued)

FOREIGN PATENT DOCUMENTS

| | | | | | |
|---|---|---|---|---|---|
| AU | 681205 | B2 | * | 8/1997 | H04B 1/713 |
| CA | 2192294 | C | * | 2/2000 | H03B 5/1203 |

(Continued)

OTHER PUBLICATIONS

H. Afzal, C. Li and O. Momeni, "A 17 Gb/s 10.7 pJ/b 4FSK Transceiver System for Point to Point Communication in 65 nm CMOS," 2022 IEEE Radio Frequency Integrated Circuits Symposium (RFIC), Denver, CO, USA, 2022, pp. 71-74, (Year: 2022).*

(Continued)

*Primary Examiner* — Berhanu Tadese
(74) *Attorney, Agent, or Firm* — Greer, Burns & Crain, Ltd.; Steven P. Fallon

(57) ABSTRACT

A 4 frequency-shift keying (4FSK) transceiver is provided. The 4FSK transceiver includes both a 4FSK transmitter and a 4FSK receiver. The 4FSK transmitter includes a voltage-controlled oscillator (VCO) and two data links coupled to the VCO for delivering two parallel streams of input data bits to the VCO. For each pair of parallel input data bits received from the two data links, the VCO outputs a modulated signal having one of four operating frequencies via 4FSK modulation. Separately, the 4FSK receiver includes a power divider, for dividing the multi-frequency modulated signal into two paths of two binary bit streams, and a pair of low-noise amplifiers (LNAs) separately (Continued)

DETAILED IMPLEMENTATION 804 OF 4FSK RECEIVER 204 coupled to the two paths and configured as a pair of band-pass filters for filtering two different subsets of the four operating frequencies from the two binary bit streams into two filtered binary bit streams.

33 Claims, 12 Drawing Sheets

(56) References Cited

U.S. PATENT DOCUMENTS

| | | | | |
|---|---|---|---|---|
| 3,525,054 | A * | 8/1970 | Denney | H04L 27/12 |
| | | | | 331/49 |
| 3,534,294 | A * | 10/1970 | Lucijan | H03B 5/1228 |
| | | | | 331/109 |
| 4,506,232 | A * | 3/1985 | Thompson | H03L 7/093 |
| | | | | 331/25 |
| 5,335,107 | A * | 8/1994 | Georges | H04B 10/504 |
| | | | | 398/189 |
| 5,412,687 | A * | 5/1995 | Sutton | H04L 27/148 |
| | | | | 375/135 |
| 5,602,868 | A * | 2/1997 | Wilson | H04B 1/40 |
| | | | | 455/142 |
| 5,757,245 | A * | 5/1998 | Song | H04L 27/12 |
| | | | | 332/100 |
| 5,793,795 | A * | 8/1998 | Li | H04B 1/715 |
| | | | | 714/784 |
| 5,832,026 | A * | 11/1998 | Li | H04L 1/0057 |
| | | | | 375/136 |
| 6,122,330 | A * | 9/2000 | Motohashi | H04L 1/08 |
| | | | | 455/135 |
| 6,150,894 | A * | 11/2000 | Seng | H03L 1/02 |
| | | | | 331/116 R |
| 6,160,861 | A * | 12/2000 | McCollough | H03C 3/095 |
| | | | | 375/376 |
| 6,185,264 | B1 * | 2/2001 | Gashus | H04L 27/12 |
| | | | | 375/272 |
| 6,198,763 | B1 * | 3/2001 | Inoue | H04J 13/10 |
| | | | | 375/147 |
| 6,218,909 | B1 * | 4/2001 | Eban | H03B 5/1847 |
| | | | | 331/36 L |
| 6,225,873 | B1 * | 5/2001 | Hill | H03C 3/16 |
| | | | | 331/107 A |
| 6,356,143 | B2 * | 3/2002 | Waltman | H03J 3/08 |
| | | | | 330/306 |
| 6,522,208 | B1 * | 2/2003 | Knowles | H03K 3/0315 |
| | | | | 331/34 |
| 7,432,773 | B2 * | 10/2008 | Kuppusamy | H03M 1/0872 |
| | | | | 331/185 |
| 7,826,403 | B2 * | 11/2010 | Taniguchi | H04W 84/08 |
| | | | | 455/574 |
| 9,356,706 | B2 * | 5/2016 | Stolarczyk | H04B 7/15528 |
| 9,369,827 | B2 * | 6/2016 | Cheng | H04L 5/0055 |
| 9,832,670 | B1 * | 11/2017 | Brommer | H04L 43/18 |
| 9,991,895 | B2 * | 6/2018 | Chen | H04L 7/033 |
| 10,085,159 | B2 * | 9/2018 | Brommer | H04W 24/02 |
| 10,225,748 | B2 * | 3/2019 | Brommer | H04W 24/08 |
| 10,257,002 | B2 * | 4/2019 | Nguyen | H04B 1/713 |
| 10,763,788 | B2 * | 9/2020 | Nie | H04L 27/14 |
| 10,867,757 | B2 * | 12/2020 | Nguyen | H03H 9/462 |
| 10,985,955 | B2 * | 4/2021 | Chen | G06N 3/045 |
| 11,245,359 | B2 * | 2/2022 | Li | H03B 27/00 |
| 12,121,318 | B2 * | 10/2024 | Mercier | A61B 5/0028 |
| 2001/0022540 | A1 * | 9/2001 | Hill | H03C 3/16 |
| | | | | 331/107 A |
| 2003/0169658 | A1 * | 9/2003 | Kuroda | H04L 27/10 |
| 2003/0192051 | A1 * | 10/2003 | Yuen | H04N 21/6131 |
| | | | | 348/E7.071 |
| 2005/0036567 | A1 * | 2/2005 | Tu | H04L 27/12 |
| | | | | 375/303 |
| 2007/0057740 | A1 * | 3/2007 | Ryu | H03B 5/1265 |
| | | | | 331/45 |
| 2010/0103990 | A1 * | 4/2010 | Residori | H04B 7/15528 |
| | | | | 455/503 |
| 2014/0357199 | A1 * | 12/2014 | Otis | H04B 1/38 |
| | | | | 455/73 |
| 2015/0126106 | A1 * | 5/2015 | Stolarczyk | H04B 13/02 |
| | | | | 455/74.1 |
| 2015/0281874 | A1 * | 10/2015 | Cheng | H04B 15/00 |
| | | | | 455/41.1 |
| 2017/0339576 | A1 * | 11/2017 | Brommer | H04L 27/14 |
| 2017/0339577 | A1 * | 11/2017 | Brommer | H04L 27/14 |
| 2017/0339578 | A1 * | 11/2017 | Brommer | H04L 27/0012 |
| 2017/0373893 | A1 * | 12/2017 | Rey | H04L 25/03012 |
| 2020/0044899 | A1 * | 2/2020 | Chen | G06N 3/084 |
| 2020/0076370 | A1 * | 3/2020 | Nie | H04L 27/14 |
| 2022/0022782 | A1 * | 1/2022 | Babakhani | A61B 5/14503 |
| 2025/0184194 | A1 * | 6/2025 | Afzal | H03C 3/225 |
| 2025/0202491 | A1 * | 6/2025 | Kim | H03K 5/00006 |
| 2025/0325186 | A1 * | 10/2025 | Anwar | A61B 5/002 |

FOREIGN PATENT DOCUMENTS

| | | | | | |
|---|---|---|---|---|---|
| CN | 1138394 | A * | 12/1996 | | H04L 27/148 |
| CN | 1179661 | A * | 4/1998 | | |
| CN | 1185057 | A * | 6/1998 | | |
| CN | 1292604 | A * | 4/2001 | | |
| CN | 1074215 | C * | 10/2001 | | H04B 1/713 |
| CN | 1171385 | C * | 10/2004 | | H03L 7/0895 |
| CN | 102523183 | A * | 6/2012 | | |
| CN | 104836762 | A * | 8/2015 | | H04L 27/14 |
| CN | 105791192 | A * | 7/2016 | | H04L 27/362 |
| CN | 104836762 | B * | 5/2018 | | H04L 27/122 |
| CN | 105634622 | B * | 11/2018 | | G08C 23/02 |
| CN | 105429625 | B * | 2/2020 | | H04L 25/0286 |
| CN | 116389210 | A * | 7/2023 | | H04L 27/2657 |
| CN | 116886120 | A * | 10/2023 | | H04B 1/40 |
| CN | 116886120 | B * | 4/2025 | | H04B 1/40 |
| CN | 120150656 | A * | 6/2025 | | H03L 7/093 |
| CN | 116389210 | B * | 7/2025 | | H04L 27/0014 |
| EP | 0847170 | A1 * | 6/1998 | | H04L 27/12 |
| EP | 0723720 | B1 * | 1/2002 | | H04L 27/148 |
| EP | 0847170 | B1 * | 9/2003 | | H03B 5/1296 |
| EP | 4318940 | A1 * | 2/2024 | | H03B 5/1212 |
| EP | 4572148 | A1 * | 6/2025 | | H03L 7/093 |
| GB | 2263830 | A * | 8/1993 | | H03B 5/36 |
| GB | 2317480 | A * | 3/1998 | | H04L 1/08 |
| JP | H08195622 | A * | 7/1996 | | |
| JP | H08195625 | A * | 7/1996 | | |
| JP | H09139634 | A * | 5/1997 | | |
| JP | H09223983 | A * | 8/1997 | | H04J 13/10 |
| JP | H10173440 | A * | 6/1998 | | |
| JP | 2005094802 | A * | 4/2005 | | |
| JP | 2017212624 | A * | 11/2017 | | |
| KR | 910005996 | B1 * | 8/1991 | | H03M 13/09 |
| KR | 100226284 | B1 * | 10/1999 | | H03B 5/1203 |
| KR | 20070053982 | A * | 5/2007 | | H04L 7/033 |
| KR | 100735455 | B1 * | 7/2007 | | |
| KR | 20180039603 | A * | 4/2018 | | H04B 1/44 |
| KR | 101929514 | B1 * | 12/2018 | | H03L 7/08 |
| KR | 20250091067 | A * | 6/2025 | | H03L 7/093 |
| TW | 202213959 | A * | 4/2022 | | H03L 7/00 |
| WO | WO-9510893 | A1 * | 4/1995 | | H04L 27/148 |
| WO | WO-0129978 | A1 * | 4/2001 | | H04L 27/1525 |
| WO | WO-2008047763 | A1 * | 4/2008 | | G01S 7/35 |
| WO | WO-2021138229 | A1 * | 7/2021 | | H03C 3/0966 |
| WO | WO-2023205811 | A1 * | 10/2023 | | H04L 27/2276 |
| WO | WO-2024028692 | A1 * | 2/2024 | | H03B 5/1212 |

OTHER PUBLICATIONS

H. Afzal, C. Li and O. Momeni, "A Highly Efficient 165-GHz 4FSK 17-Gb/s Transceiver System With Frequency Overlapping Architecture in 65-nm CMOS," in IEEE Journal of Solid-State Circuits, vol. 58, No. 11, pp. 3113-3126, Nov. 2023, (Year: 2023).*

S.B. Alexander et al., 4-ary FSK coherent optical communication system, Electronics Letters, vol. 26, Issue 17, Aug. 16, 1990 (Year: 2023).*

(56) References Cited

OTHER PUBLICATIONS

N. Wu et al., Ultra-low-power_RF_transceivers_for_WBANs_in_medical_applications, IEEE 2012 (Year: 2012).*

McMahill et al., A_2.5-Mb_s_GFSK_5.0-Mb_s_4-FSK_automatically_calibrated_spl_Sigma_-_spl_Delta_frequency_synthesizer, IEEE 2002 (Year: 2002).*

J. Kim, H.-S. Kim, Y. Cho and J.-Y. Kim, "Highly isolated power supply design for gate drivers of the solid state transformer," 2017 Asian Conference on Energy, Power and Transportation Electrification (ACEPT), Singapore, 2017, pp. 1-5, (Year: 2017).*

X. Zan and A.-T. Avestruz, "Isolated Ultrafast Gate Driver with Variable Duty Cycle for Pulse and VHF Power Electronics," in IEEE Transactions on Power Electronics, vol. 35, No. 12, pp. 12678-12685, Dec. 2020, (Year: 2020).*

J. Weckbrodt, N. Ginot, C. Batard and T. L. Le, "Communication using the Isolated Power Supply of Gate Drivers for SiC Semiconductors Monitoring applications," PCIM Europe 2019, pp. 1-5, International Exhibition and Conference for Power Electronics (Year: 2019).*

Furse et al., "Laboratory Project in Wireless FSK Receiver Design", BYU Scholars Archive, Feb. 1, 2004.

* cited by examiner

CONVENTIONAL FOUR FREQUENCY-SHIFT KEYING (4FSK) TRANSCEIVER 100

DEMODULATION PRINCIPLES OF TRANSCEIVER 200

EXEMPLARY LAYOUT 600 OF VCO 500

DETAILED IMPLEMENTATIONS OF FREQUENCY DOUBLER 714 AND AMPLIFIER 716

M1=M2=M3:
20 μm / 60 nm

DETAILED IMPLEMENTATION 804 OF 4FSK RECEIVER 204

EXEMPLARY LAYOUT 900 OF SLOT POWER DIVIDER (SPD) 808

| Length | $L_1$ | $L_2$ | $L_3$ | $L_4$ | $L_5$ | $L_6$ | $L_7$ | $W_{1-2}$ | $W_{3-4}$ |
|---|---|---|---|---|---|---|---|---|---|
| (μm) | 181 | 150 | 12 | 147 | 78 | 163 | 37 | 10 | 12 |

DETAILED IMPLEMENTATION 1000 OF A UNIT CELL FOR THE LNAS IN FIG. 8

FABRICATED CHIP DIE 1202 OF THE 4FSK TRANSMITTER

FABRICATED CHIP DIE 1204 OF THE 4FSK RECEIVER

MULTI-GIGABIT PER SECOND FREQUENCY-SHIFT KEYING (FSK) TRANSCEIVER

CROSS-REFERENCE TO RELATED APPLICATION

This application claims the benefit of U.S. Provisional Patent Application Ser. No. 63/333,796, entitled "MULTI-GIGABIT PER SECOND FREQUENCY-SHIFT KEYING (FSK) TRANSCEIVER,", filed on 22 Apr. 2022, the contents of which are incorporated by reference herein.

GOVERNMENT LICENSE RIGHTS

This invention was made with U.S. Government Support under Grant No. 1932821, awarded by the National Science Foundation. The U.S. Government has certain rights in the invention.

BACKGROUND

Field

The disclosed embodiments generally relate to the fields of digital communications and the designs of high speed transceivers. More specifically, the disclosed embodiments relate to the designs of high energy-efficient, high data-rate frequency-shift keying (FSK) transceivers.

Related Art

Implementation of fully-integrated millimeter-wave (mm-wave) and sub-Terahertz (THz) wireless communication systems are of great interest in next-generation digital communications. The targeted applications for such systems include 4K video streaming, wireless augmented reality (AR), virtual reality (VR), internet of things (IoT), 5G and future 6G communication systems, wireless data centers, and sensors. These applications often require multi-Gb/s data rates, sufficient range, and high energy efficiency. The large available bandwidths in mm-wave and sub-THz frequency bands can be used to achieve such required multi-Gb/s data rates. In addition, short wavelengths at these application frequencies allow for smaller circuit and antenna sizes.

Advances in communication technology emerge on a regular basis, but the need for energy-efficient wireless communication schemes increases unremittingly. In particular, efforts have been concentrated on implementing multi-Gb/s data rate transceiver systems during the past few years. The recent advanced multi-Gb/s transceiver systems have mostly employed digital modulation techniques such as phase-shift keying (PSK), quadrature amplitude modulation (QAM), and on-off keying (OOK). Note that PSK and QAM modulations are widely used in modern multi-Gb/s transceiver systems because of their spectral efficiency. Although spectrally efficient, PSK and QAM transceiver systems require coherent transceiver architectures, which significantly increase the complexity and power consumption of these systems by demanding accurate synthesizers and I/Q (In-phase and Quadrature) mixers. In addition, in a fully integrated PSK/QAM communication system, an on-chip modem is typically required, which further adds to the complexity and power consumption. These modems are high-resolution analog-to-digital (ADC) and digital-to-analog (DAC) converters, which are challenging to design at multi-Gb/s data rates. Moreover, amplitude changes in the QAM modulation schemes can force the power amplifiers to operate in the back-off region that can significantly reduce their efficiency.

In contrast, the OOK-based transceivers generally do not require modems, which makes them a good choice for low-power transceiver designs. Furthermore, OOK provides a simpler and more direct radio frequency (RF) modulation and demodulation scheme that significantly simplifies the transceiver architecture. However, despite the aforementioned advantages of the OOK modulation scheme, it can only provide a one-bit-per-symbol rate of communication, thereby considerably limiting the achievable data rates.

Hence, what is needed is a wireless data communication scheme for transceiver designs that can provide both higher data rates and greater power efficiencies than the existing systems and techniques without the aforementioned drawbacks of the existing systems and techniques.

SUMMARY

The disclosed embodiments provide various transmitter (TX) and receiver (RX) designs based on 4 frequency-shift keying (4FSK) modulation/demodulation schemes to simultaneously achieve multi-Gb/s data rate, low power consumption, and low complexity without requiring coherent transceiver architectures. In some embodiments, the proposed 4FSK communication scheme is implemented non-coherently without separate modulators/demodulators (i.e., modems), thereby reducing the power consumption and boosting the energy efficiency. Moreover, when implementing 4FSK on the receiver side, the input signal at the receiver (RX) can be divided into two parallel paths instead of four, thereby further reducing the power consumption and further reducing chip area. In some embodiments, only one voltage-controlled oscillator (VCO) is used in the transmitter core of the 4FSK communication scheme, wherein the single VCO is configured to generate four different target frequencies based on the two parallel streams of binary input data. Moreover, the disclosed 4FSK receiver is configured with a frequency overlapping architecture to demodulate the 4FSK signals from the disclosed 4FSK transmitter and recover the two parallel streams of binary data with full fidelity.

In some implementations, the disclosed 4FSK transmitter (TX) and receiver (RX) architectures are used to implement a 17 Gb/s communication system at 145 to 185 GHZ operating frequencies. Such a 4FSK transceiver was shown to consume only ~182 mW of power (~60 mW by the implemented 4FSK transmitter and ~120 mW by the implemented 4FSK receiver) in a 65 nm CMOS, and a 10.7 pJ/bit energy efficiency was achieved. The disclosed 4FSK transceiver designs have achieved multi-Gb/s wireless communication data rate and one of the highest energy efficiencies now known in transceiver systems that support 17 Gb/s or higher.

In one aspect, a 4 frequency-shift keying (4FSK) transceiver is disclosed. This 4FSK transceiver includes both a 4FSK transmitter and a 4FSK receiver. The 4FSK transmitter further includes a voltage-controlled oscillator (VCO) and two data links coupled to the VCO for delivering two parallel streams of input data bits to the VCO. Note that for each pair of parallel input data bits received from the two data links, the VCO is configured to output a modulated signal having one of four operating frequencies via 4FSK modulation, thereby producing a multi-frequency modulated signal. Separately, the 4FSK receiver includes a power divider for dividing the multi-frequency modulated signal into two paths of two binary bit streams and a pair of low-noise amplifiers (LNAs) separately coupled to the two paths and configured as a pair of band-pass filters for filtering two different subsets of the four operating frequencies from the two binary bit streams into two filtered binary bit streams. The 4FSK receiver additionally includes, in each of the two paths, a power detector for demodulating the pairs of filtered data bits from the two filtered binary bit streams according to power measurements of the two filtered binary bit streams.

In some embodiments, the VCO in the 4FSK transmitter further includes two sets of varactors, wherein each set of varactors is controlled by one of the two streams of input data bits. Moreover, a voltage applied to each set of varactors is controlled by each stream of the two streams of input data bits.

In some embodiments, the two voltages applied to the two sets of varactors by the two streams of input data bits determine one of the four operating frequencies.

In some embodiments, the two voltages applied to the two sets of varactors correspond to one of the four permutations of a pair of binary bits. Moreover, each permutation of the four permutations corresponds to one of the four operating frequencies.

In some embodiments, the transmitter further includes two sets of inverters, wherein each set of inverters is coupled between one of two streams of input data bits and the corresponding set of varactors. Moreover, each set of inverters is configured to convert each received data bit in the given stream of input data bits into either a digital High voltage or a digital Low voltage for controlling the corresponding set of varactors.

In some embodiments, the transmitter further includes a frequency doubler following the VCO and wherein the frequency doubler is configured to double the four operating frequencies generated by the VCO and frequency tuning ranges of the VCO, thereby generating four target frequencies of the 4FSK modulation.

In some embodiments, the four operating frequencies are 75 GHZ, 80 GHZ, 85 GHz, and 90 GHz, and the four target frequencies are 150 GHz, 160 GHz, 170 GHz, and 180 GHz.

In some embodiments, the transmitter further includes an amplifier following the frequency doubler and wherein the amplifier is configured to increase an output power of the transmitter and to equalize the powers associated with the four types of modulated signals outputted from the transmitter at the four target frequencies.

In some embodiments, the power divider is a slot power divider that further includes: (1) a first transmission line configured to receive the multi-frequency modulated signal; (2) a slot line positioned perpendicular to the transmission line and configured to couple the multi-frequency modulated signal from the transmission line into a second transmission line and a third transmission line equally into two identical multi-frequency modulated signals; and (3) a pair of matching networks, each matching network is coupled to one of the second and the third transmission lines to couple one of the two identical multi-frequency modulated signals to one of two output ports of the slot power divider.

In some embodiments, the four operating frequencies include four equally spaced frequencies $f_1$, $f_2$, $f_3$, and $f_4$ in an ascending order. Moreover, the first LNA in the pair of LNAs is configured to pass frequencies $f_2$ and $f_3$ and remove frequencies $f_1$ and $f_2$ from one of the two binary bit streams to generate the first filtered binary bit streams. Coherently, the second LNA in the pair of LNAs is configured to pass frequencies $f_3$ and $f_4$ and remove frequencies $f_1$ and $f_2$ from the other one of the two binary bit streams to generate the second filtered binary bit streams.

In some embodiments, the two different subsets of the four operating frequencies include a common frequency, and the two output spectra of the pair of LNAs overlap each other.

In some embodiments, the power detector is configured to demodulate the pairs of filtered data bits by: (1) generating a (0,0) binary data pair when both the first and the second filtered data bits are simultaneously detected as low power levels; (2) generating a (1,0) binary data pair when the first and the second filtered data bits are simultaneously detected as high power level and low power level, respectively; (3) generating a (1,1) binary data pair when both the first and the second filtered data bits are simultaneously detected as high power levels; and (4) generating a (0,1) binary data pair when the first and the second filtered data bits are simultaneously detected as low power level and high power level, respectively.

In some embodiments, the generated (0,0) binary data pair corresponds to frequency $f_1$ in both the first binary bit stream and the second binary bit stream. The generated (1,0) binary data pair corresponds to frequency $f_2$ in both the first binary bit stream and the second binary bit stream. The generated (1,1) binary data pair corresponds to frequency $f_3$ in both the first binary bit stream and the second binary bit stream. Finally, the generated (0,1) binary data pair corresponds to frequency $f_4$ in both the first binary bit stream and the second binary bit stream.

In some embodiments, the binary data pairs generated by the power detector are gray code in relation to the four frequencies $f_1$, $f_2$, $f_3$, and $f_4$. Hence, demodulating the two filtered binary bit streams additionally includes converting the gray code generated by the power detector into the binary code associated with the multi-frequency modulated signal.

In some embodiments, each data stream of the two parallel streams of input data bits has a data rate of 8-10 Gb/s. Moreover, the two parallel streams of input data bits of the two data links have a combined data rate of 16-20 Gb/s.

In some embodiments, the transmitter and the receiver are used non-coherently without the need for synchronization between the transmitter and the receiver.

In some embodiments, the transmitter and the receiver can be implemented on the same chip or on two different chips.

In yet another aspect, a 4FSK transmitter is disclosed. This 4FSK transmitter includes a voltage-controlled oscillator (VCO) and two data links coupled to the VCO for delivering two parallel streams of input data bits to the VCO. The 4FSK transmitter further includes an antenna for radiating a multi-frequency modulated signal wireless toward a 4FSK receiver. Moreover, for each pair of parallel input data bits received from the two data links, the VCO outputs a modulated signal having one of four operating frequencies via four frequency-shift keying (4FSK) modulation, thereby producing the multi-frequency modulated signal.

In some embodiments, the VCO in the 4FSK transmitter further includes two sets of varactors, wherein each set of varactors is controlled by one of the two streams of input data bits. Moreover, a voltage applied to each set of varactors is controlled by each stream of the two streams of input data bits.

In some embodiments, the two voltages applied to the two sets of varactors in the 4FSK transmitter correspond to one of the four permutations of a pair of binary bits. Moreover, each permutation of the four permutations corresponds to one of the four operating frequencies.

In some embodiments, the 4FSK transmitter further includes two sets of inverters, wherein each set of inverters is coupled between one of two streams of input data bits and the corresponding set of varactors. Moreover, each set of inverters is configured to convert each received data bit in the given stream of input data bits into either a digital High voltage or a digital Low voltage for controlling the corresponding set of varactors.

In some embodiments, the 4FSK transmitter further includes a frequency doubler following the VCO and wherein the frequency doubler is configured to double the four operating frequencies generated by the VCO and frequency tuning ranges of the VCO, thereby generating four target frequencies of the 4FSK modulation.

In some embodiments, the four operating frequencies are 75 GHZ, 80 GHz, 85 GHz, and 90 GHz, and the four target frequencies are 150 GHz, 160 GHz, 170 GHz, and 180 GHz.

In some embodiments, the 4FSK transmitter further includes an amplifier following the frequency doubler and wherein the amplifier is configured to increase an output power of the transmitter and to equalize the powers associated with the four types of modulated signals outputted from the transmitter at the four target frequencies.

In still another aspect, a 4FSK receiver is disclosed. This 4FSK receiver includes an antenna for receiving a multi-frequency modulated 4FSK signal generated by a 4FSK transmitter and transmitted toward the 4FSK receiver, wherein the multi-frequency modulated 4FSK signal comprises four operating frequencies associated with a 4FSK modulation. The 4FSK receiver further includes a power divider for dividing the multi-frequency modulated signal into two paths of two binary bit streams. The 4FSK receiver additionally includes a pair of low-noise amplifiers (LNAs) separately coupled to the two paths, wherein the pair of LNAs is configured as a pair of band-pass filters for filtering two different subsets of the four operating frequencies within the two binary bit streams into two filtered binary bit streams. The 4FSK receiver also includes, in each of the two paths, a power detector for demodulating the pairs of filtered data bits from the two filtered binary bit streams according to power measurements of the two filtered binary bit streams.

In some embodiments, the power divider in the 4FSK receiver is a slot power divider that further includes: (1) a first transmission line configured to receive the multi-frequency modulated signal; (2) a slot line positioned perpendicular to the transmission line and configured to couple the multi-frequency modulated signal from the transmission line into a second transmission line and a third transmission line equally into two identical multi-frequency modulated signals; and (3) a pair of matching networks, wherein each matching network is coupled to one of the second and the third transmission lines to couple one of the two identical multi-frequency modulated signals to one of two output ports of the slot power divider.

In some embodiments, the four operating frequencies received by the 4FSK receiver include four equally spaced frequencies $f_1$, $f_2$, $f_3$, and $f_4$ in an ascending order. Moreover, the first LNA in the pair of LNAs is configured to pass frequencies $f_2$ and $f_3$ and remove frequencies $f_1$ and $f_2$ from one of the two binary bit streams to generate the first filtered binary bit streams. Concurrently, the second LNA in the pair of LNAs is configured to pass frequencies $f_3$ and $f_4$ and remove frequencies $f_1$ and $f_2$ from the other one of the two binary bit streams to generate the second filtered binary bit streams.

In some embodiments, the two different subsets of the four operating frequencies include a common frequency, and the two output spectra of the pair of LNAs overlap each other.

In some embodiments, the power detector in the 4FSK receiver is configured to demodulate the pairs of filtered data bits by: (1) generating a (0,0) binary data pair when both the first and the second filtered data bits are simultaneously detected as low power levels; (2) generating a (1,0) binary data pair when the first and the second filtered data bits are simultaneously detected as high power level and low power level, respectively; (3) generating a (1,1) binary data pair when both the first and the second filtered data bits are simultaneously detected as high power levels; and (4) generating a (0,1) binary data pair when the first and the second filtered data bits are simultaneously detected as low power level and high power level, respectively.

In some embodiments, the generated (0,0) binary data pair corresponds to frequency $f_1$ in both the first binary bit stream and the second binary bit stream. The generated (1,0) binary data pair corresponds to frequency $f_2$ in both the first binary bit stream and the second binary bit stream. The generated (1,1) binary data pair corresponds to frequency $f_3$ in both the first binary bit stream and the second binary bit stream. Finally, the generated (0,1) binary data pair corresponds to frequency $f_4$ in both the first binary bit stream and the second binary bit stream.

In some embodiments, the binary data pairs generated by the power detector of the 4FSK receiver are gray code in relation to the four frequencies $f_1$, $f_2$, $f_3$, and $f_4$. Hence, demodulating the two filtered binary bit streams additionally includes converting the gray code generated by the power detector into the binary code associated with the multi-frequency modulated signal.

In some embodiments, each data stream of the two parallel streams of input data bits has a data rate of 8-10 Gb/s. Moreover, the two parallel streams of input data bits of the two data links have a combined data rate of 16-20 Gb/s.

In some embodiments, the 4FSK receiver and the 4FSK transmitter that generates and radiates the multi-frequency modulated 4FSK signal are used non-coherently without the need for synchronization between the 4FSK receiver and the 4FSK transmitter.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
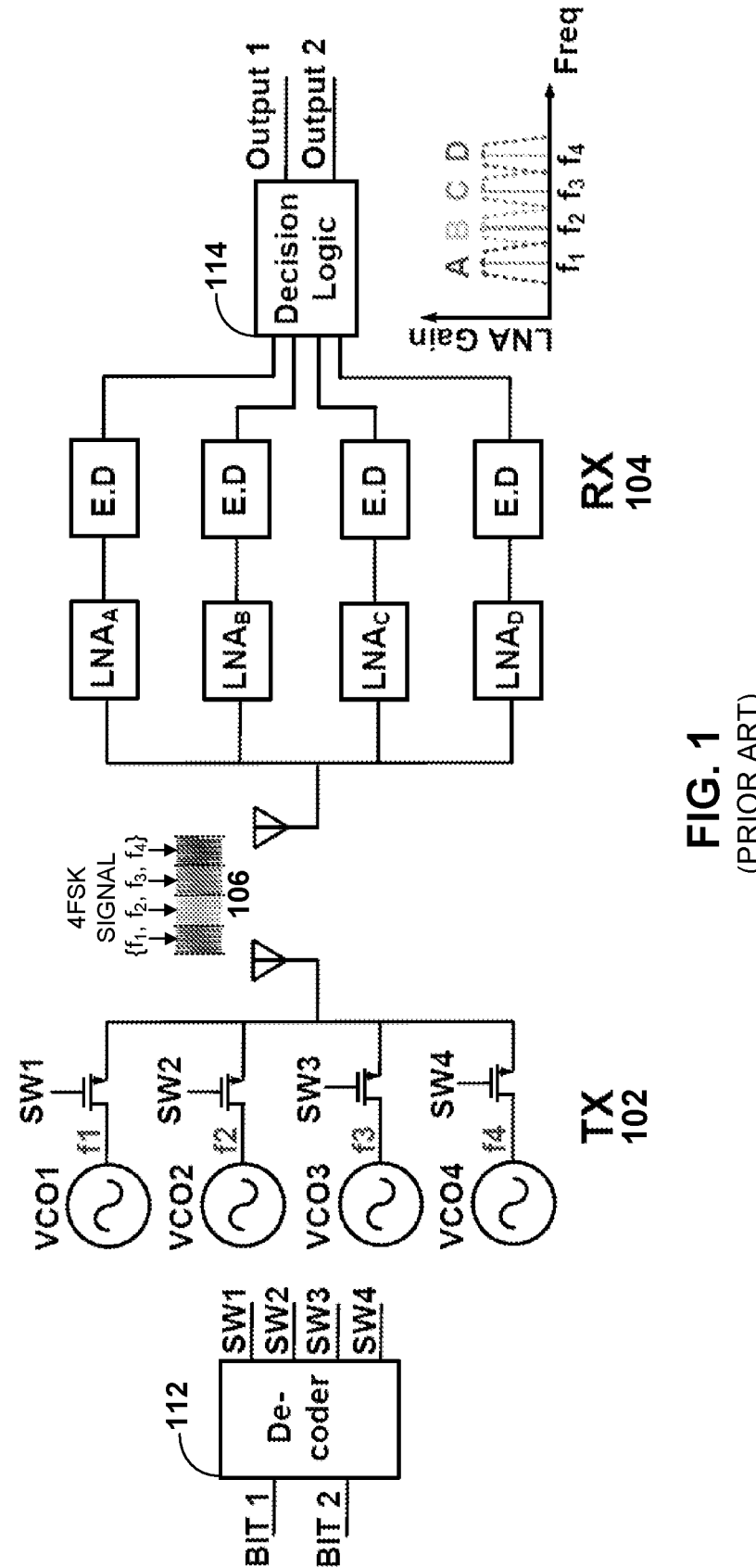
FIG. 1 shows the schematic diagram of a conventional 4 frequency-shift keying (4FSK) transceiver.

FIG. 1 shows the schematic diagram of a conventional 4 frequency-shift keying (4FSK) transceiver 100. As can be seen in FIG. 1, 4FSK transceiver 100 includes a transmitter (TX) 102 and a receiver (RX) 104. Note that four voltage-controlled oscillators (VCOs), namely $VCO_1$ to $VCO_4$, are used in transmitter (TX) 102, wherein the four VCOs are tuned at four different frequencies (i.e., $f_1$, $f_2$, $f_3$, and $f_4$), respectively. Note also that the output of the transmitter (TX) 102 is controlled by four switches (i.e., $SW_1$, $SW_2$, $SW_3$, and $SW_4$) that are configured to determine the frequency (i.e., one of $f_1$, $f_2$, $f_3$, and $f_4$) of the radiated 4FSK signal 106. Moreover, the input of the transmitter (TX) 102 is composed of two parallel streams of binary data (i.e., BIT1 and BIT2) that are simultaneously applied to a decoder 112 to create four parallel channels of switch signals. Based on the input data, only one of the four switches $SW_1$-$SW_4$ is in the ON state (i.e., ON) while the other three switches are in the OFF state (i.e., OFF) at any given moment. As a result, a 4FSK signal can be achieved at the output of the transmitter (TX) 102. On the side of receiver (RX) 104 in 4FSK transceiver 100, the received 4FSK signal 106 is divided into four parallel data paths. In the four paths, four low-noise amplifiers ($LNA_A$, $LNA_B$, $LNA_C$, and $LNA_D$), each in a different data path, are tuned to the four frequencies $f_1$, $f_2$, $f_3$, and $f_4$, respectively. The respective envelope detectors (EDs) following the LNAs are configured to detect the power of the respective signals outputted from the LNAs and generate corresponding data bits. The four generated data bits at any given time are then sent to the decision block (or "decision logic") 114 which is configured to reconstruct the two parallel streams of binary data as the outputs (i.e., Output1 and Output2).

However, the 4FSK transceiver architecture in FIG. 1 has a number of drawbacks. Firstly, the four VCOs in the TX 102 significantly increase the overall power consumption of 4FSK transceiver 100. Secondly, the coupling between the four VCOs can cause frequency pulling on individual VCOs and corrupt the modulated signal. Thirdly, the switches within transmitter (TX) 102 are lossy due to the associated parasitics, which become more prominent at the mm-wave frequencies. Such significant parasitics can both decrease the output power of the TX 102 and limit the achievable data rate. Fourthly, the switching operations of the set of VCOs create phase discontinuity, which subsequently spreads the spectrum and increases the required bandwidth. In addition, the four signal paths within the corresponding amplifiers and detectors in the receiver (RX) 104 side further add to the overall power consumption and reduce the overall transceiver efficiency.

Figures 2A, 2B:
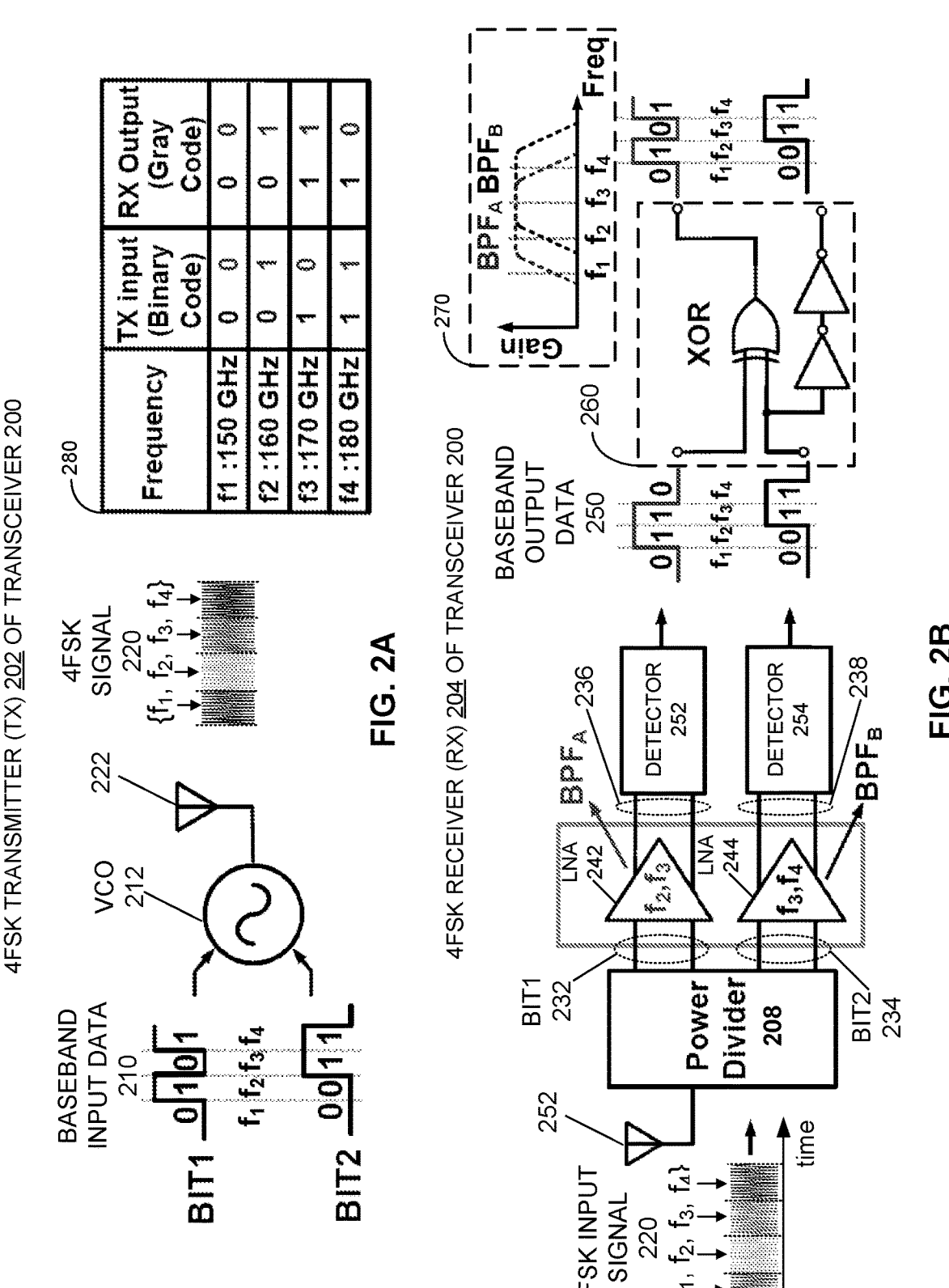
FIG. 2A shows a block diagram and operation principles of a transmitter (TX) of a 4FSK transceiver in accordance with the disclosed embodiments.
FIG. 2B shows a block diagram and operation principles of a receiver (RX) of a 4FSK transceiver in accordance with the disclosed embodiments.

FIGS. 2A-B are block diagrams of a disclosed 4FSK transceiver 200 that simultaneously achieves high data rate, high energy efficiency, and low power consumption in accordance with the disclosed embodiments. Specifically, FIG. 2A shows a block diagram and operation principles of a transmitter (TX) 202 of the disclosed 4FSK transceiver 200 in accordance with the disclosed embodiments. As can be seen in FIG. 2A, transmitter (TX) 202 is composed of just one VCO 212 instead of four VCOs as in the conventional transceiver 100 of FIG. 1. As a result, the power consumption of transmitter (TX) 202 is significantly reduced compared to transmitter (TX) 102. Note that transmitter (TX) 202 receives two parallel streams of binary data (i.e., BIT1 and BIT2) as inputs, wherein these two binary data streams are also referred to as the baseband input data 210. Note that instead of decoding the baseband input data 210 into four channels, the two binary input data streams are directly applied to the single VCO 212, and more specifically, to a set of varactors (not explicitly shown) within VCO 212 that can be used to change the output frequency of VCO 212.

More specifically, within transmitter (TX) 202 of 4FSK transceiver 200, VCO 212 is configured to generate four distinct target frequencies $f_1$, $f_2$, $f_3$, and $f_4$ corresponding to the four input binary data pairs permutations of (0,0), (0,1), (1,0) and (1,1), respectively. In other words, depending on the received two-bit binary data combination in the binary input data 210, the two or more varactors in VCO 212 generate a different combined capacitance that corresponds to one of the four distinct frequencies $f_1$, $f_2$, $f_3$, and $f_4$ to be produced. These correspondences between different binary data pairs and the four distinct frequencies of the proposed 4FSK modulation scheme are also shown at the input of VCO 212 in FIG. 2A, which is referred to as a "binary code." Note that the specific correspondences between the set of frequencies and the set of binary data pairs shown, i.e., (0,0)→$f_1$, (0,1)→$f_2$, (1,0)→$f_3$, and (1,1)→$f_4$, depend on the specific design of the set of varactors in VCO 212. In an alternative embodiment to VCO 212, it is possible to generate the four frequencies $f_1$, $f_2$, $f_3$, and $f_4$ with different correspondences, such as: (1,1)→$f_1$, (1,0)→$f_2$, (0,1)→$f_3$, and (0,0)→$f_4$, without departing from the scope of the present disclosure.

In some embodiments, the four 4FSK frequencies $f_1$, $f_2$, $f_3$, and $f_4$ have an equal or substantially equal spacing between a pair of adjacent frequencies, wherein this frequency spacing can be determined based on a target data rate to be achieved by 4FSK transceiver 200. As an example, to achieve a target data rate of 20 Gb/s (i.e., 10 Gb/s in each data stream), a required Null-to-Null bandwidth will be 50 GHz, and the corresponding 3 dB bandwidth is ~40 GHz. For the four 4FSK data channels, each channel will have ~10 GHz bandwidth. Therefore, the four target frequencies of the 4FSK signal can be selected as $f_1$=150 GHz, $f_2$=160 GHz, $f_3$=170 GHz, and $f_4$=180 GHz which result in a 10 GHz frequency spacing. Note that this frequency spacing four the target frequencies of the 4FSK signal will increase when the target data rate increases, or the frequency spacing will decrease when the target data rate decreases, to achieve the channel bandwidth requirements.

Note that in the design of transmitter (TX) 202, no switches are required at the output of transmitter (TX) 202, because only one VCO is used to generate all four FSK frequencies based on the data received. By eliminating the switches, transmitter (TX) 202 for 4FSK communications can operate at significantly higher frequencies than those frequencies associated with 4FSK transceiver 100, and at the same time consumes significantly less power than would be required in 4FSK transceiver 100. Note also that VCO 212 within transmitter (TX) 202 simultaneously modulates and upconverts the baseband input data 210, thereby eliminating the need for a separate modulator in transmitter (TX) 202. Hence, transmitter (TX) 202 of the disclosed transceiver 200 is not only simpler to implement than the conventional 4FSK transmitter 102 of transceiver 100, it is also significantly simpler to implement than existing PSK/QAM transmitters. As can be seen in FIG. 2A, VCO 212 of transmitter (TX) 202 generates modulated and upconverted 4FSK signal 220 comprising the aforementioned four target frequencies, wherein 4FSK signal 220 is radiated by an antenna 222 wirelessly toward a receiver device (not shown in FIG. 2A).

In various embodiments, this receiver device is implemented using the disclosed receiver architecture described below.

Although 4FSK transmitter (TX) 202 uses a single VCO 212 to generate all four 4FSK frequencies $f_1$, $f_2$, $f_3$, and $f_4$, other embodiments of the disclosed 4FSK transceiver can instead employ 2 VCOs in the transmitter. In some illustrative embodiments, the first VCO can be configured to generate two of the four 4FSK frequencies, such as $f_1$ and $f_2$, while the second VCO can be configured to generate the other two of the four 4FSK frequencies, such as $f_3$, and $f_4$. Moreover, the 2-VCO 4FSK transmitter will include one or more switches, or a digital circuit coupled to the two outputs of the two VCOs, configured to determine and then select one of the two VCO outputs to be sent to the output of the 2-VCO 4FSK transmitter. For example, the 2-VCO 4FSK transmitter can include two switches, wherein each of the two switches is coupled to one of the two VCO outputs. The two switches are configured to operate in tandem to select one of the two VCO outputs as the output of the 2-VCO 4FSK transmitter at a given timestep. Even though such a 2-VCO 4FSK transmitter design is more complex than single VCO 4FSK transmitter (TX) 202, the 2-VCO 4FSK transmitter is still less complex than conventional 4FSK transmitter (TX) 102, and therefore can still achieve significant lower power consumption.

FIG. 2B shows a block diagram and operation principles of a receiver (RX) 204 of the disclosed 4FSK transceiver 200 in accordance with the disclosed embodiments. Note that transmitter (TX) 202 and receiver (RX) 204 may be integrated on the same chip to form the entirety of the disclosed 4FSK transceiver 200. However, transmitter (TX) 202 and receiver (RX) 204 can also be implemented on different chips or in different systems to independently perform the designed functionalities of the disclosed 4FSK transmitter and the disclosed 4FSK receiver. Such independent operations are possible because a given transmitter and a given receiver in the 4FSK scheme can be used incoherently without the need for synchronization between the two.

As can be seen in FIG. 2B, 4FSK signal 220 generated by transmitter (TX) 202 in FIG. 2A is the input to receiver (RX) 204 (e.g., is received by an antenna 252), wherein a power divider block (or "power divider") 208 following antenna 252 is configured to divide the received 4FSK input signal 220 into two parallel paths of two binary bit/data streams, namely, BIT1 232 and BIT2 234. Note that in comparison with receiver 104 in the conventional 4FSK transceiver 100, the number of data paths in receiver (RX) 204 is reduced to one half of those required in receiver (RX) 104. As a result, the power consumption of receiver (RX) 204 is significantly reduced compared to receiver 104. Note also that each of the two data paths in receiver (RX) 204 is composed of a low-noise amplifier (LNA), namely LNA 242 and LNA 244, respectively, and also a signal/power detector, namely detector 252 and detector 254, respectively, wherein the LNA and the corresponding detector are coupled serially as shown.

In some embodiments, LNA 242 in the first data path is tuned to frequencies $f_2$ and $f_3$, while LNA 244 in the second data path is tuned to frequencies $f_3$ and $f_4$. Specifically, each of the LNAs 242 and 244 can be configured into a band-pass filter (BPF), namely, $BPF_A$ and $BPF_B$, wherein $BPF_A$ is configured to pass frequencies $f_2$ and $f_3$ and block frequencies $f_1$ and $f_4$, whereas $BPF_B$ is configured to pass frequencies $f_3$ and $f_4$ and block frequencies $f_1$ and $f_2$. In a particular embodiment, the gain profile of $BPF_A$ is tuned such that the gain of LNA 242 is maximized and substantially constant for the band of frequencies from $f_2$ to $f_3$, and the gain profile of $BPF_B$ is tuned such that the gain of LNA 244 is maximized and substantially constant for the band of frequencies from $f_3$ to $f_4$. Exemplary gain-frequency responses of LNA 242/$BPF_A$ and LNA 244/$BPF_B$ are collectively shown in the inset 270 in FIG. 2B. Consequently, the two band-passed signals 236 and 238 generated by LNA 242/$BPF_A$ and LNA 244/$BPF_B$ overlap each other. Note that designing such overlapping filters at these frequencies in receiver 204 is possible because the sufficiently high frequency spacing (e.g., 10 GHz) can be achieved in mm-wave frequency transceiver designs.

Following the LNAs in receiver (RX) 204, each respective detector 252 or detector 254 is configured to sense the power of the band-passed signal at the output of the corresponding LNAs and generate "1" or "0" bits based on a threshold of the detectors 252 and 254 that can be adjusted to clearly distinguish the power of the band-pass signals $BPF_A$ and $BPF_B$.

Figure 3:
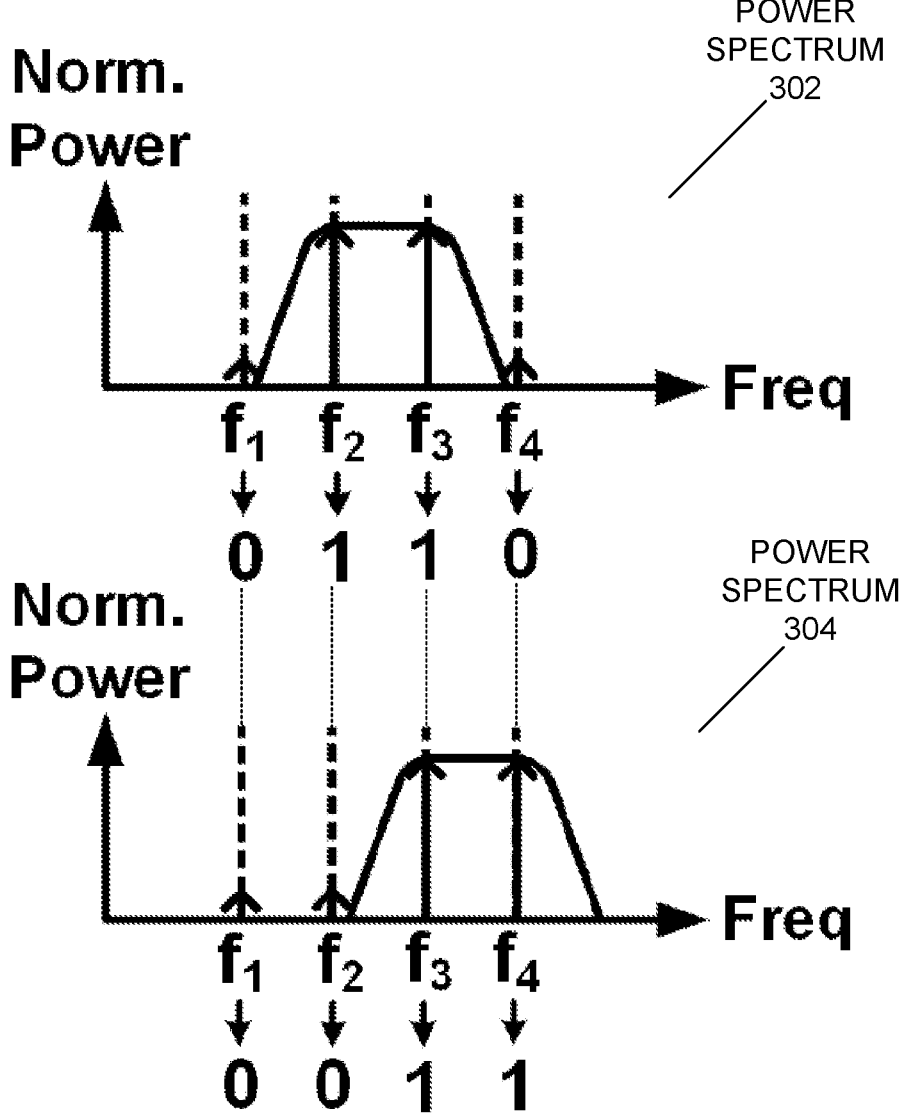
FIG. 3 shows the principle of demodulating a received 4FSK modulated signal comprising the four frequencies $f_1$, $f_2$, $f_3$, and $f_4$ into the four binary data pairs using low-noise amplifiers (LNAs) and power detectors in accordance with the disclosed embodiments.

FIG. 3 shows the principle of demodulating the received 4FSK modulated signal 220 comprising the four frequencies $f_1$, $f_2$, $f_3$, and $f_4$ into the four binary data pairs using the disclosed LNAs and the power detectors in accordance with the disclosed embodiments. Specifically, the two power spectra 302 and 304 correspond to the two band-passed signals 236 and 238 from the two LNAs 242 and 244, respectively, wherein in each power spectrum, the vertical axis represents the normalized output power from the corresponding LNA, and the horizontal axis represents the frequency.

As can be seen in FIG. 3, when frequency $f_1$ is received through 4FSK signal 220, both LNAs 242 and 244 generate low power levels, which are subsequently detected by the power detectors 252 and 254 as a bit pair "0" and "0." When frequency $f_2$ is received through 4FSK signal 220, LNAs 242 and 244 generate a high power level and a low power level, respectively, which are subsequently detected by the detectors 252 and 254 as a bit pair "1" and "0." When frequency $f_3$ is received through 4FSK signal 220, both LNAs 242 and 244 generate high power levels, which are subsequently detected by the detectors 252 and 254 as a bit pair "1" and "1." Finally, when frequency $f_4$ is received through 4FSK signal 220, LNAs 242 and 244 generate a low power level and a high power level, respectively, which are subsequently detected by the detectors 252 and 254 as a bit pair "0" and "1." Consequently, at the output of detectors 252 and 254, four binary data pairs (0,0), (1,0), (1,1) and (0,1) corresponding to the four FSK frequencies $f_1$, $f_2$, $f_3$, and $f_4$, respectively, will be continuously generated as output data 250 based on the two parallel bit streams BIT1 232 and BIT2 234.

The principle of demodulating the received 4FSK modulated signal 220 of four frequencies $f_1$, $f_2$, $f_3$, and $f_4$ by 4FSK receiver (RX) 204 into the four binary data pairs can be implemented in various embodiments/forms on 4FSK receiver (RX) 204, and therefore is not limited to the implementation shown in FIG. 3. For example, one of the two LNAs (referred to as $LNA_A$) in the first signal path can be tuned to band-pass frequencies $f_1$ and $f_2$, while the other/second LNA (referred to as $LNA_B$) in the second signal path can be tuned to band-pass frequencies $f_2$ and $f_3$. As such, in this embodiment, frequency $f_1$ will be represented by binary pair (1,0), frequency $f_2$ by binary pair (1,1), frequency $f_3$ by binary pair (0,1), and frequency $f_4$ by binary pair (0,0), all at the output of 4FSK receiver (RX) 204. A person skilled in the art would readily appreciate that there can be still other $LNA_A$ and $LNA_B$ designs/configurations to allow other forms of 4FSK modulated signal demodulations, wherein the four binary pairs (0,0), (0,1), (1,0) and (1,1) and the four FSK frequencies $f_1$, $f_2$, $f_3$, and $f_4$ would have other types of correspondences not described above.

Referring back to FIG. 2B, note that while the data bits at the input of transmitter 202 are binary code, the output data 250 at the output of detectors 252 and 254 become the gray code. In some embodiments, to recover and fully reconstruct the binary code of input data 210 from the gray code in output data 250, a simple digital logic circuit 260 comprising an XOR gate and a pair of inverters is included in receiver (RX) 204 following detectors 252 and 254 to translate the gray code back to the same binary code of the original input data 210. Note that other circuit designs different from circuit 260 can be used to achieve the same translations from the gray code to the binary code. For the convenience of visualization, a table of correspondences among the binary code in the input data 210 on 4FSK transmitter (TX) 202, the gray code in the output data 250 on 4FSK receiver (RX) 204, as well as the four exemplary target frequencies is shown in the inset 280 in FIG. 2B. Note that the disclosed 4FSK receiver (RX) 204 can demodulate the encoded 4FSK data by using just the two above-described data paths, thereby significantly simplifying the receiver architecture and further reducing the power consumption in comparison to the conventional 4FSK receiver 104. Moreover, the disclosed 4FSK receiver (RX) 204 is capable of directly demodulating the 4FSK signal without the need for a separate demodulator or data converter.

Compared with the conventional 4FSK receiver (RX) 104, the disclosed 4FSK receiver (RX) 204 also differs in terms of how the lowest frequency $f_1$ is processed. Specifically, even though the frequency $f_1$ is generated on transmitter (TX) 204 in a similar manner to conventional transmitter (TX) 104, the 4FSK signal at frequency $f_1$ is filtered out in 4FSK receiver (RX) 204. As a result, 4FSK receiver (RX) 204 does not care about the power level of the 4FSK signal 220 at $f_1$ frequency. This also means that there is no signal-to-noise-ratio (SNR) requirement for 4FSK receiver (RX) 204 to detect the signal at $f_1$ frequency, which is not the case in the conventional 4FSK architecture 100. Consequently, the bit-error-rate (BER) performance of the disclosed 4FSK transceiver 200 is always better than that of the conventional 4FSK architecture 100.

Figure 4:
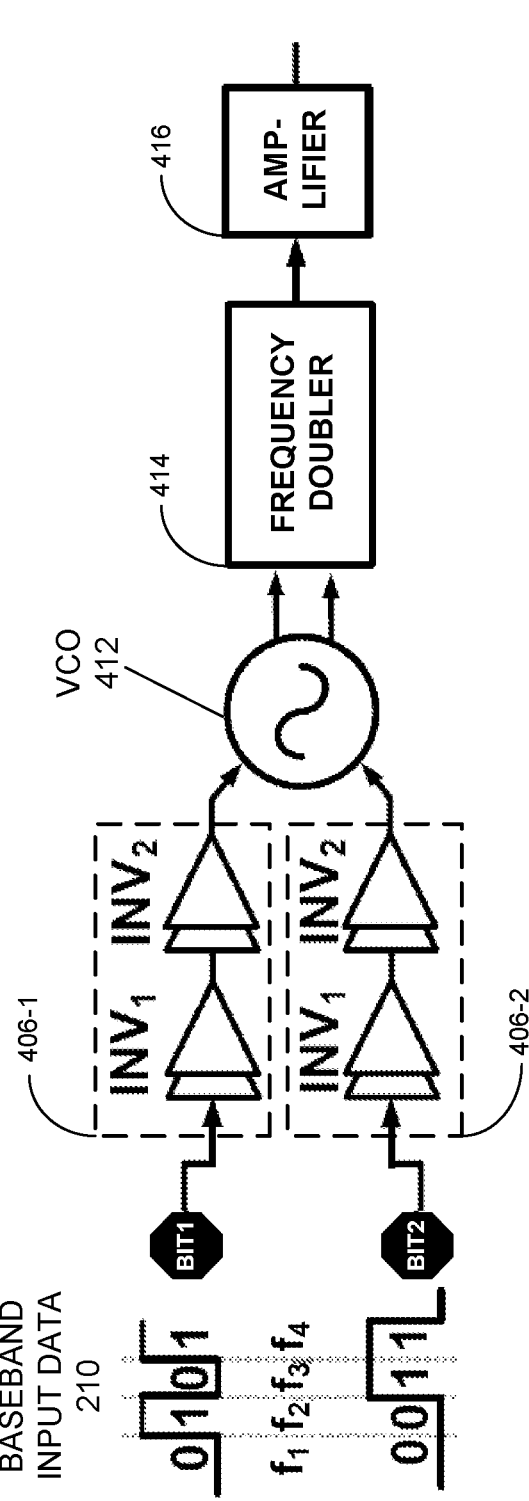
FIG. 4 shows a block diagram of a detailed implementation of the 4FSK transmitter (TX) of FIG. 2A in accordance with the disclosed embodiments.

FIG. 4 shows a block diagram of a detailed implementation 402 of the disclosed 4FSK transmitter (TX) 202 in FIG. 2A in accordance with the disclosed embodiments. Note that in addition to the core component shown in FIG. 2A (i.e., VCO 412), 4FSK transmitter (TX) 402 also includes two sets of inverters 406-1 and 406-2, a frequency doubler module (or simply "frequency doubler") 414 and an amplifier 416, which are all coupled with VCO 412 in series in the manner shown in FIG. 4. As can be seen in FIG. 4, the two input ports of 4FSK transmitter (TX) 402 receives the two parallel paths of binary data streams BIT1 and BIT2 as inputs (i.e., based input data 210), respectively. The input binary data streams BIT1 and BIT2 are first applied to the two sets of inverters 406-1 and 406-2, respectively, which drive the respective varactors (not explicitly shown) within VCO 412. Each set of inverters 406-1 and 406-2 (e.g., using a VDD of 1V) is configured to convert sine waves into square waves, and to ensure that a near square-wave signal is received by the varactors in VCO 412. The square-wave input signals to VCO 412 facilitate achieving fast switching at the desired operating frequency range (e.g., in 100-500 GHz range) among the set of four FSK frequencies $f_1$, $f_2$, $f_3$, and $f_4$. In some embodiments, each set of inverters 406-1 or 406-2 includes four stages of unit inverters. Note that without using these inverters, the capacitance changes of the varactors may lag behind the data signal change.

VCO Designs

Note that one of the challenges of implementing 4FSK modulation/demodulation schemes at mm-wave frequencies is the very high bandwidth requirement and relatively low bandwidth efficiency of the 4FSK transmitters. More specifically, for a given data rate, the bandwidth requirement for the 4FSK modulation should be 2.5× of the given data rate. For example, if a data rate of 10 GB/s is needed, a 25 GHz bandwidth is required to implement the 4FSK modulation. Such high bandwidth requirement significantly increases the complexity on the VCO designs, which becomes the bottleneck of designing 4FSK transceivers. Similarly, a target data rate of 20 Gb/s would require 50 GHz bandwidth. However, designing a VCO to accommodate 50 GHz bandwidth is extremely difficult.

Using the proposed 4FSK transmitter (TX) 402, it is possible to design the VCO 412 with a significantly lower bandwidth than the 2.5× data rate requirement. This is made possible because frequency doubler 414 is used to double the frequency tuning range and the frequency spacing, thereby doubling the overall operable bandwidth of 4FSK transmitter (TX) 402. More specifically, we can first design VCO 412 to achieve just one half of the bandwidth requirement/frequency tuning range, wherein the full bandwidth requirement is subsequently achieved by frequency doubler 414. As a result, the design complexity and requirements for the single VCO 412 in 4FSK transmitter (TX) 402 is significantly reduced and the overall bandwidth efficiency of 4FSK transmitter (TX) 402 is significantly increased. Next, amplifier 416 can be used to increase the output power of 4FSK transmitter (TX) 402 and to equalize the powers for the four output signals at the four FSK frequencies by carefully matching network design within amplifier 416. Note that in certain implementations, if the bandwidth requirement for 4FSK transmitter (TX) 402 is low due to a lower target data rate, frequency doubler 414 in the disclosed 4FSK transmitter (TX) 402 becomes optional and can be left out.

In a particular implementation of 4FSK transmitter (TX) 402, two parallel paths of binary data streams, each carrying 10 Gb/s, are applied to the four stages of inverters 406-1 and 406-2. The varactors in the VCO 412 are sized such that VCO 412 generates four frequencies at 75 GHz, 80 GHz, 85 GHz, and 90 GHz corresponding to the input data pairs of (0,0), (0,1), (1,0), and (1,1), respectively. Note that these frequencies are half frequencies of the target 4FSK frequencies at 150 GHz, 160 GHz, 170 GHz, and 180 GHz, which are subsequently achieved by frequency doubler 414. The layout of VCO 412 should be carefully designed to reduce the coupling between the two parallel data streams at the input side (which are digital signals) and the generated output signals that are fed to frequency doubler 414 (which are differential analog signals).

One technique to increase the frequency tuning range of the VCOs is based on inductor and capacitor switching. While simple to design and straightforward in achieving the 4FSK modulation, the inductor and capacitive switching technique suffers from a trade-off between the ON resistance of the MOS switches and its parasitic capacitance in the OFF state. This trade-off becomes more prominent at operational frequencies over 50 GHz. In some implementations of VCO 412, NMOS varactors are used for frequency tuning. Note that the capacitances of NMOS varactors can be controlled by the associated control voltages, thereby eliminating the need for using MOS switches. Generally speaking, VCOs based on NMOS varactors provide significantly larger tuning ranges and higher quality factors than VCOs based on capacitor switching.

Figure 5:
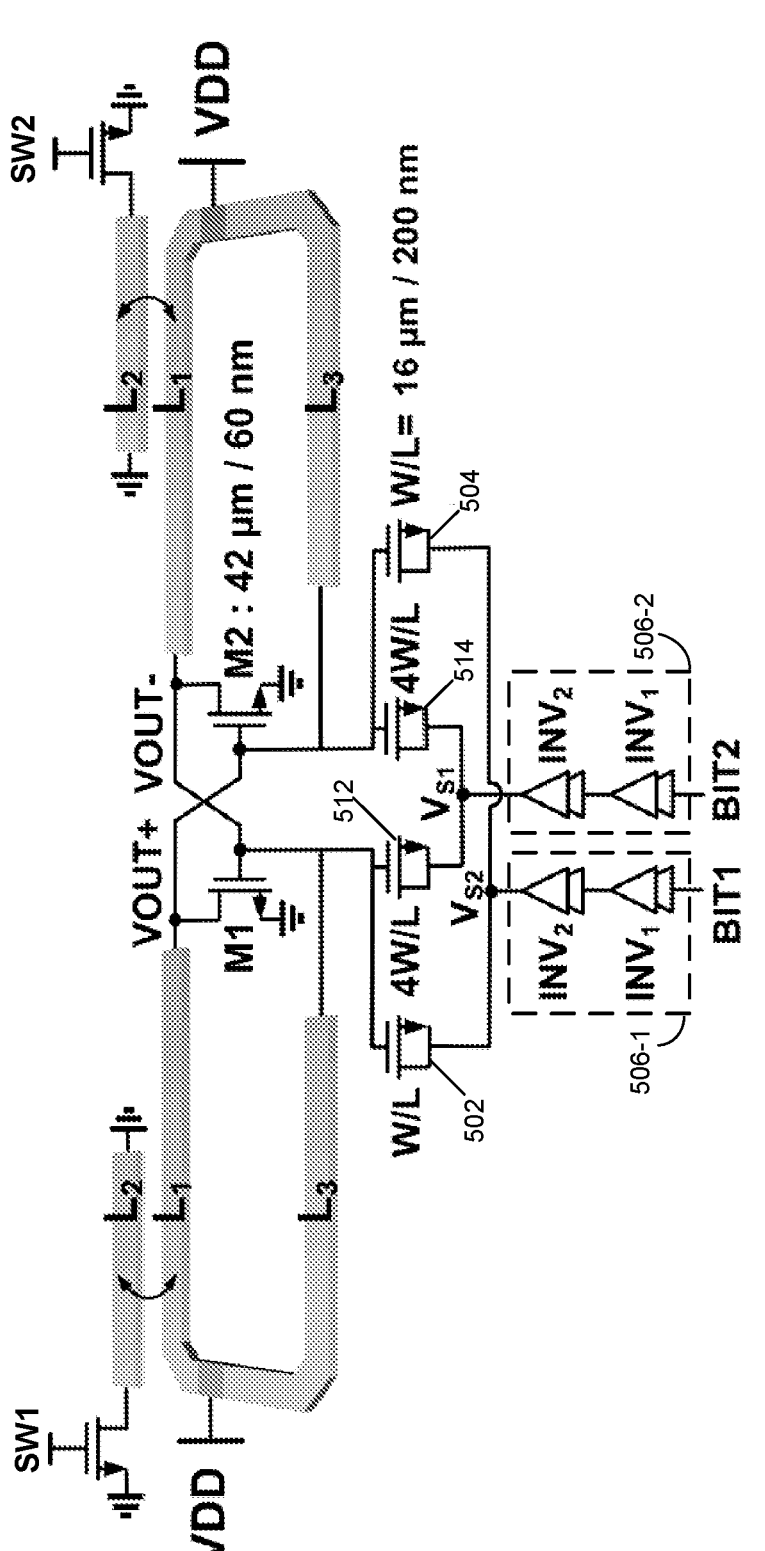
FIG. 5 shows a circuit diagram of an exemplary implementation of the VCO in the 4FSK transmitter (TX) of FIG. 4 in accordance with the disclosed embodiments.

FIG. 5 shows a circuit diagram of an exemplary implementation 500 of VCO 412 in 4FSK transmitter (TX) 402 in accordance with the disclosed embodiments. As can be seen in FIG. 5, the core transistors M1 and M2 in VCO 500 are sized with W/L (i.e., channel width/channel length) ratios of 42-$\mu$m/60-nm. Two sets of NMOS varactors, which comprise two smaller varactors 502 and 504 and two larger varactors 512 and 514, are coupled to the VCO's core transistors M1 and M2 to implement the 4FSK modulation. The inverters 506-1 and 506-2 ensure that the voltage at each of the two control nodes $V_{S1}$ and $V_{S2}$ is either 0V or 1V. The control nodes $V_{S1}$ and $V_{S2}$ are virtual grounds and therefore the output impedance of the inverters 506-1 and 506-2 is not seen by the VCO 500 at the fundamental oscillation frequency. In some implementations, the size of the smaller varactors 502 and 504 is 16 $\mu$m/200 nm (labeled as W/L) whereas the size of the larger varactors 512 and 514 is 64 $\mu$m/200 nm (labeled as 4 W/L). Note that the tank of VCO 500 includes transmission lines $L_1$ and $L_3$ which are coupled in parallel, so the lengths of $L_1$ and $L_3$ are relatively large for easier and more reliable implementation. VCO 500 also includes two switches $SW_1$ and $SW_2$ that are directly coupled to the left transmission line $L_2$ and the right transmission line $L_2$, respectively. These two switches SW1 and SW2 are configured to effectuate fine-tuning of VCO frequencies by changing the inductance of transmission lines $L_1$ via the inductance of transmission lines $L_2$.

One reason that the embodiment of VCO 500 or VCO 412 of 4FSK transmitter (TX) 202 employs two varactors for each data stream/signal path (i.e., BIT1 or BIT2) is because VCO 500 or VCO 412 is configured differentially to generate a differential output. However, in other embodiments of VCO 212 in the proposed 4FSK transmitter (TX) 202, VCO 212 can be configured to have a single-ended architecture. In such embodiments, VCO 212 of 4FSK transmitter (TX) 202 can employ just one varactor for each data stream/signal path.

Figure 6:
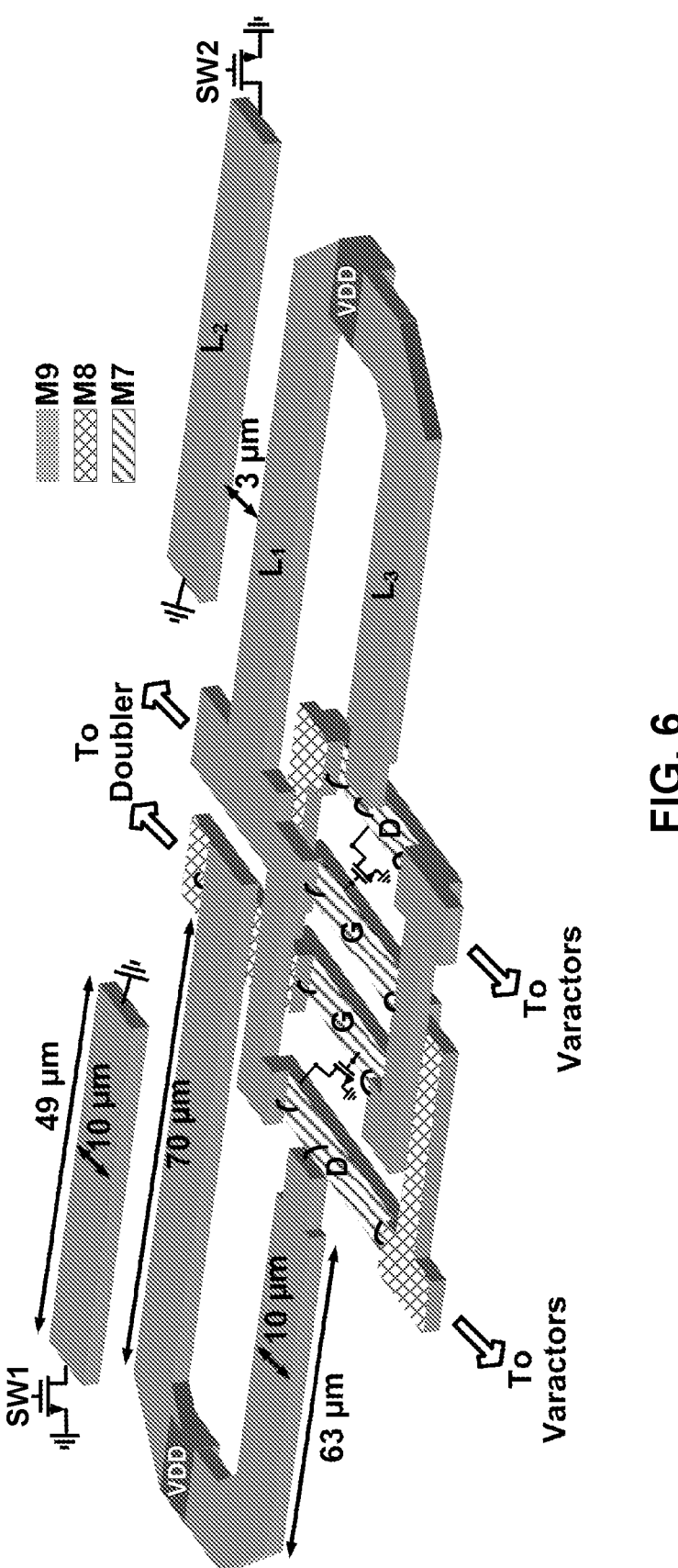
FIG. 6 illustrates an exemplary three-dimensional (3D) layout of the transmission lines of the VCO shown in FIG. 5 in accordance with the disclosed embodiments.

FIG. 6 illustrates an exemplary three-dimensional (3D) layout 600 of the transmission lines of the implemented VCO 500 in FIG. 5 in accordance with the disclosed embodiments. As can be seen in FIG. 6, two sets of transmission lines $L_1$ and $L_3$ (which are implemented in M9 layer shown with solid gray) are designed to be positioned on both the left side and the right side of the VCO's core transistors to enable access to both data streams and the outputs of the VCO 600 from the top side and the bottom side, respectively. Note the impedance looking into $L_1$ from the VCO tank is a function of the impedance of $L_2$ (also implemented in M9 layer) in series with the switch SW1 and SW2. As a result, the two switches SW1 and SW2 can be used to perform the above-described fine frequency tuning. Note that this ability of fine frequency tuning is particularly useful when the four generated frequencies $f_1$, $f_2$, $f_3$, and $f_4$ are not exactly the target FSK frequencies as a result of the process variations. In some implementations, the VDD of VCO 600 is set to 1V and is coupled to the VDD plane for adequate AC coupling to ground. In some embodiments, the VDD plane is implemented in M3 and M4 metal layers.

Note that the VCO designs depicted in FIGS. 5-6 have to satisfy at least two criteria. As the first criterion, the VCO designs should achieve a fast frequency transition between the four FSK frequencies to be able to support multi-Gb/s data rates (e.g., at 20 Gb/s). The transition speed between the 4FSK frequencies in the disclosed VCOs depends on two parameters: (1) the time it takes for the varactors to change their capacitances when their respective control voltages change; and (2) the time it takes for the cross-coupled VCO to adjust the frequency by reacting to the change in the varactor's capacitance. It can be shown that the transition speed and ultimately the maximum achievable data rate of the disclosed 4FSK transmitters is mainly limited by the time it takes for the varactors to change their capacitances.

The second criterion for the VCO designs is the tuning range. The VCO designs must have enough tuning range to generate the four FSK frequencies with the required frequency spacing. Note that larger varactors can provide more tuning range but at the same time limiting the data rate, because it takes longer time to charge/discharge a larger varactor. Moreover, larger varactors introduce more parasitic capacitors and therefore reduce the oscillation frequency. As a result, the varactors have to be judiciously sized to balance the trade-offs between the tuning range, the data rate, and the center frequency. In some embodiments, these tradeoffs can be further alleviated by carefully sizing the inverters 506-1 and 506-2 to minimize the rise and fall times at the control nodes $V_{S1}$ and $V_{S2}$ in FIG. 5.

Frequency Doubler and Amplifier Designs

Figure 7:
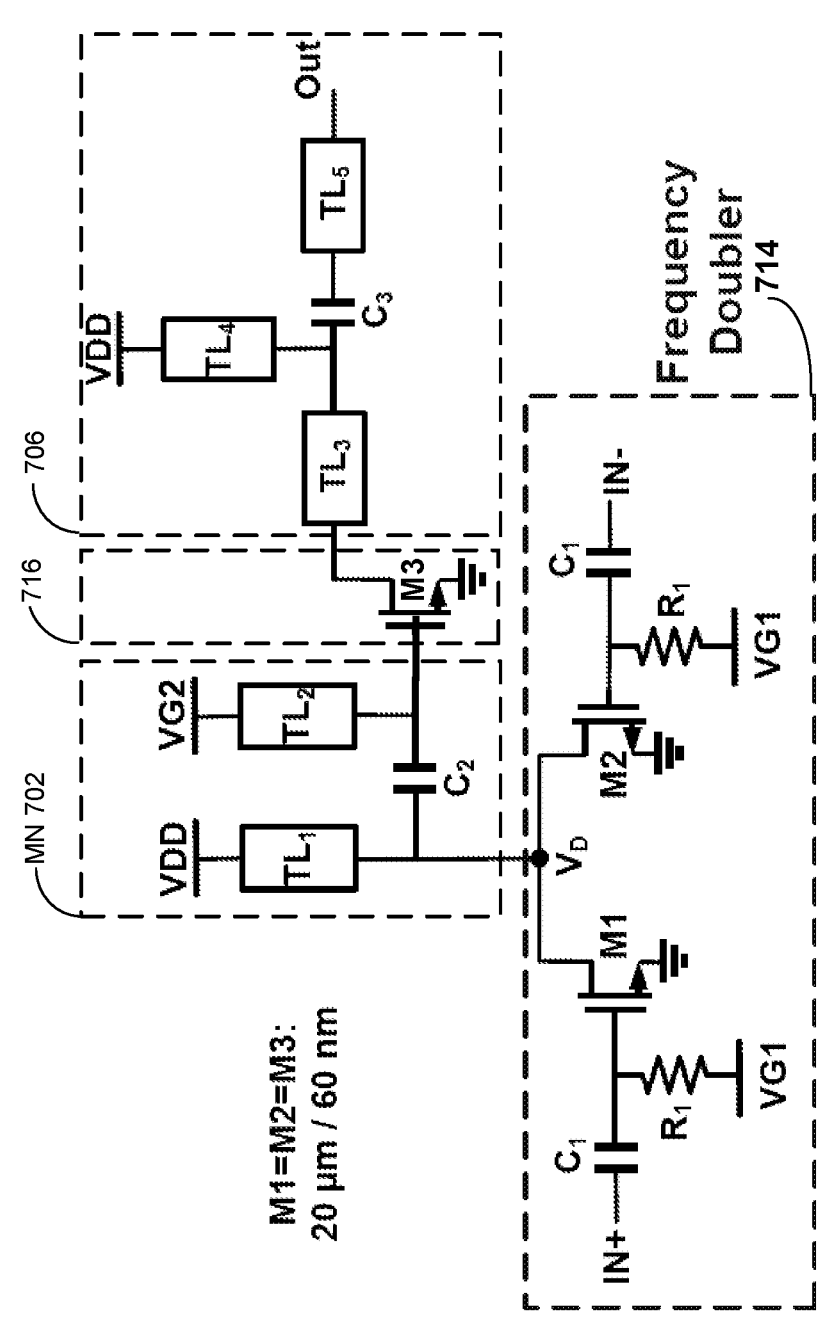
FIG. 7 shows a circuit diagram of an exemplary frequency doubler and an exemplary amplifier for implementing the frequency doubler and the amplifier shown in the 4FSK transmitter (TX) of FIG. 4 in accordance with the disclosed embodiments.

FIG. 7 shows a circuit diagram of an exemplary frequency doubler 714 and an exemplary amplifier 716 for implementing frequency doubler 414 and amplifier 416 in 4FSK transmitter (TX) 402 in accordance with the disclosed embodiments. As can be seen in FIG. 7, the push-push frequency doubler 714 is composed of two common-source transistors M1 and M2 coupled in parallel. In some embodiments, the DC gate voltages of these transistors are set to 0.5V by the respective $R_1$ resistors. The simulation results show that higher DC bias for the transistors M1 and M2 of frequency doubler 714 significantly increases the power consumption, but does not significantly increase the gain of the frequency doubler 714. Note that transmission lines $TL_1$, $TL_2$, and capacitor $C_2$ form the inter-stage matching network (MN) 702 between frequency doubler 714 and amplifier 716. The amplifier 716 comprises one stage common-source configuration with a transistor M3. The gate voltage (also referred to as the "bias voltage") of M3 is selected based on a trade-off between the gain of amplifier 716 and the associated power consumption. In some embodiments, the bias voltage of M3 is set to 0.8V to balance the above-described trade-off.

The circuit diagram of FIG. 7 additionally includes an output matching network 706 including transmission lines $TL_3$, $TL_4$, $TL_5$ and capacitor $C_3$. This output matching network is judiciously configured so that the power of the 4FSK signals at 160, 170, and 180 GHz are substantially similar to each other. As described above in conjunction with 4FSK receiver 204, the 150 GHz (i.e., $f_1$) signal is blocked/filtered out in both signal paths of the disclosed 4FSK receiver. However, it is necessary to generate 150 GHz (i.e., $f_1$) in the 4FSK transmitter 202 because including the $f_1$ frequency makes the frequency transitions in VCO 212 significantly faster. On the other hand, there should be little concern on the power of the 150 GHz (i.e., $f_1$) signal. The design choice of the disclosed 4FSK receiver 204 to block 150 GHz (i.e., $f_1$) signal instead of the 180 GHz (i.e., $f_4$) signal is that the varactors in 4FSK receiver 204 generally have higher losses when tuned to 150 GHz than when tuned to 180 GHz.

Figure 8:
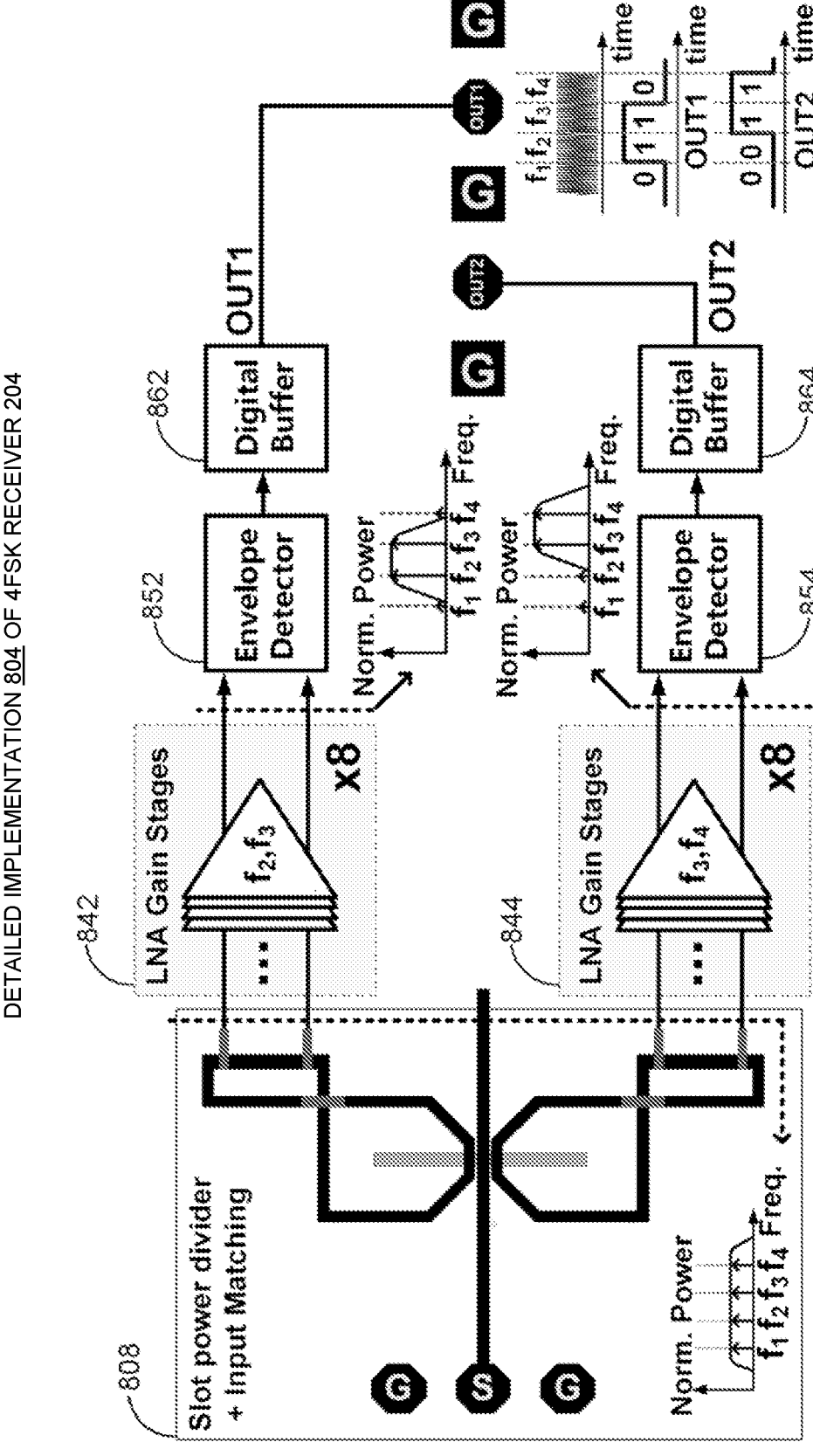
FIG. 8 shows a circuit diagram of a more detailed implementation of the disclosed 4FSK receiver (RX) of FIG. 2B in accordance with the disclosed embodiments.

FIG. 8 shows a circuit diagram of a more detailed implementation 804 of the disclosed 4FSK receiver (RX) 204 in FIG. 2B in accordance with the disclosed embodiments. Note that in the exemplary 4FSK receiver 804, power divider 208 in 4FSK receiver (RX) 204 is implemented with a slot power divider (SPD) 808 for splitting the received 4FSK input signal 220 equally into two parallel data paths. Note that each data path in receiver (RX) 804 is comprised of either a first series of LNA gain stages (or "first LNA stages") 842 or a second series of LNA gain stages (or "second LNA stages") 844 to implement LNA 242 or LNA 244 of 4FSK receiver (RX) 204. Note also that SPD 808 includes two symmetrical sides, wherein each side is configured to output one of the two split 4FSK signals as a differential signal to be fed into a corresponding LNA 842 or 844. Each data path in 4FSK receiver (RX) 804 further comprises either an envelope detector 852 or an envelope detector 854 to implement power detector 252 or detector 254 of 4FSK receiver (RX) 204. Moreover, each data path in receiver (RX) 804 additionally includes a baseband amplifier (not explicitly shown) and an output digital buffer 862 or digital buffer 864. We now describe more detailed design considerations for individual circuit blocks in 4FSK receiver 804.

Slot Power Divider (SPD)

It has been demonstrated that the slot-line-based power divider/combiner can achieve low-loss, wideband and balanced performance at frequencies over 120 GHz. Given the wide band requirements for the target operating frequencies of the disclosed 4FSK transceivers, a slot power divider (SPD) design similar to the one described in "A 200-GHz Power Amplifier With a Wideband Balanced Slot Power Combiner and 9.4-dBm Psat in 65-nm CMOS: Embedded Power Amplification," by H. Bameri and O. Momeni, IEEE Journal of Solid-State Circuits, vol. 56, no. 11, pp. 3318-3330, 2021 (hereinafter "Bameri") can be used in the disclosed 4FSK receiver designs.

Figure 9:
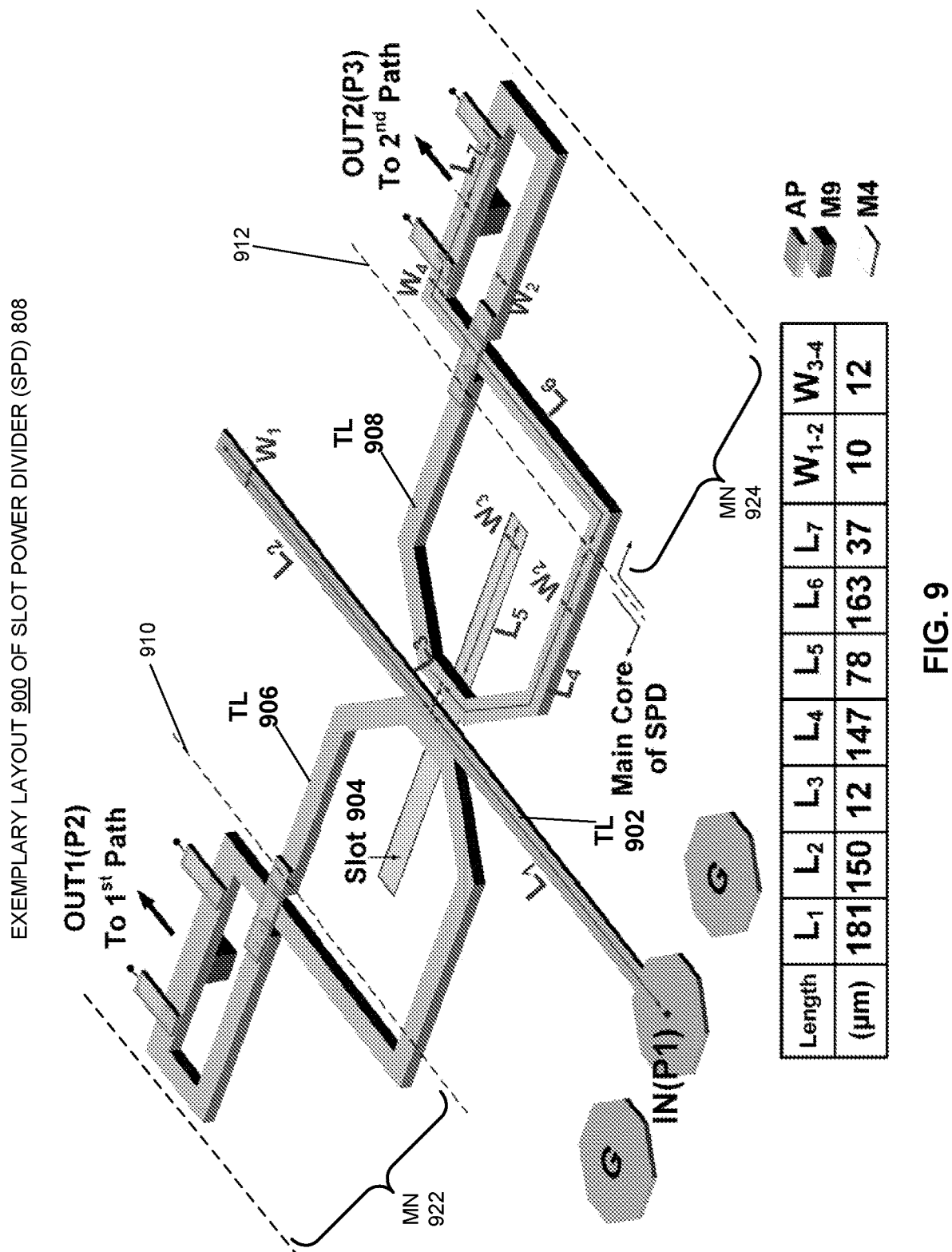
FIG. 9 shows an exemplary layout of the SPD in FIG. 8 in accordance with the disclosed embodiments.

FIG. 9 shows an exemplary layout 900 of SPD 808 in FIG. 8 in accordance with the disclosed embodiments. As can be seen in FIG. 9, the main core of SPD 900 is situated between the two dashed lines 910 and 912, and includes a transmission line (TL) 902, a slot line (or "slot") 904, a TL 906 for the first data path, and TL 908 for the second data path. The input signal is applied to TL 902 implemented in the AP layer, creating a current in TL 902. This current is coupled to slot 904 implemented in the ground plane (M4 layer) as the current travels along TL 902 over slot 904 perpendicularly. Conversely, the field generated in slot 904 is coupled to both TL 906 and TL 908 implemented in M9 layer. In the particular SPD implementation of SPD 900, the transition is excited by only the odd-mode TE wave propagating through slot 904. The above microstrip-slotline and slotline-microstrip structures can be modeled as two transformers equivalent to simple LC tanks (see Bameri). This model facilitates design of SPD 900 to achieve a wideband performance by carefully calibrating the two resonant frequencies of the microstrip-slotline structure. The extended transmission lines (e.g., $L_6$ and $L_7$ in the second data path) coupled to the main core of SPD 900 form the matching networks (MNs) 922 and 924, and also change the direction of the two outputs of SPD 900 to be in the same direction. Note that making the two outputs of SPD 900 in the same direction facilitates coupling the following LNA stages to SPD 900 and making sure the two output bit streams can be collected from the same side of the chip layout.

The bandwidth of SPD 900 is configured to encompass all four carrier frequencies, while the bandwidth of the LNA stages in each data path only needs to encompass two overlapping frequency ranges as described in conjunction with FIGS. 2B and 3. Due to the low port-to-port isolation of SPD 900, the bandwidth of SPD 900 would be limited by the narrow band matching networks within the LNA stages in each data path. To address this issue, the first LNA stage in each data path needs to employ a wide band input matching network and a neutralization technique to provide isolation between the corresponding LNA stages and SPD 900.

LNA Designs

To explore the speed limit of the proposed 4FSK receivers, we can consider the worst-case scenario when two sideband signals with frequency spacing of $f_m$ from the designated FSK carrier frequency are generated and when the data rate is $2f_m$ in each data channel. For example, if the binary pair (0,0) is changed to binary pair (0,1) at the transmitter, the frequency tones of $f_1 \pm f_m$, and $f_2 \pm f_m$ are generated in the 4FSK radiated signal on the transmitter side. The disclosed 4FSK receivers can then extract the data bit information by detecting the corresponding frequency tones and their sidebands.

In an implementation where the 4FSK frequency spacing is 10 GHZ, and the target data rate is 20 Gb/s, the maximum sideband $f_m$ for each data path will be 5 GHz. For a second order matching network (e.g., a "T" matching network) used in the disclosed 4FSK receiver, the roll-off will be 4 dB/GHz (or 40 dB/decade). To have more than 10 dB gain suppression of the unwanted sidebands, the bandwidth of the LNAs should be less than 15 GHz. While lower bandwidth for each data path can provide better suppression for the undesired signals and can reduce the integrated noise, it also reduces the data rate by suppressing the desired higher order sidebands. Therefore, the optimal bandwidth of the LNAs for the target 20 Gb/s data rate and target 10 GHz frequency spacing should be designed to be around 15 GHz.

Figure 10:
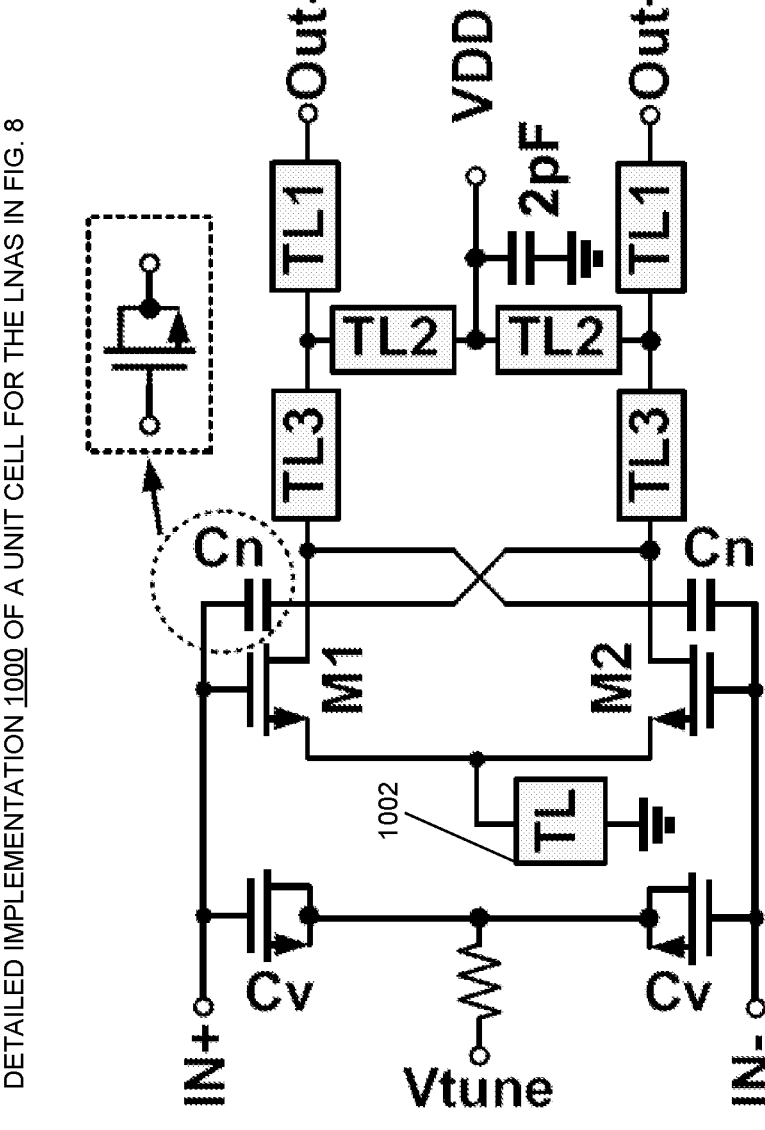
FIG. 10 shows a circuit diagram of an exemplary unit cell (i.e., a single LNA stage) for the LNA stages depicted in FIG. 8 in accordance with the disclosed embodiments.

FIG. 10 shows a circuit diagram of an exemplary unit cell 1000 (i.e., a single LNA stage) for the LNA stages depicted in FIG. 8 in accordance with the disclosed embodiments. In a particular implementation, the width and length ratio (W/L) of the transistor (M1 and M2) in unit cell 1000 is 10 μm/60 nm. While using smaller transistors for the LNA stage can reduce the power consumption of the amplifier, it also requires smaller neutralization capacitors that can be challenging to implement. In this particular implementation, the capacitor $C_n$ for neutralization is around 4 fF. The current density of the M1 and M2 transistors is 0.5 mA/1 μm as a compromise between the minimum noise figure and the maximum available gain. A transmission line (TL=20 μm) 1002 is added to the source of the transistors M1 and M2 to avoid common mode oscillation. Because the 4FSK receiver demodulation depends on the relative gain of the LNA at different frequencies, the maximum gain for the paths can be different, as long as each path can provide enough amplification for the signal to be detected.

Note that the frequency bands of the LNAs mainly depend on the two resonant tanks created by the "T" matching network. Frequency tuning can be achieved by changing the input impedance of the transistors, thus modifying one of resonance frequencies for the matching network. In the single LNA stage 1000, to compensate for the frequency shifts due to the process variation, NMOS varactors (Cr) are used in the input of the transistors M1 and M2.

Envelope Detector and Baseband Circuit Designs

Figure 11:
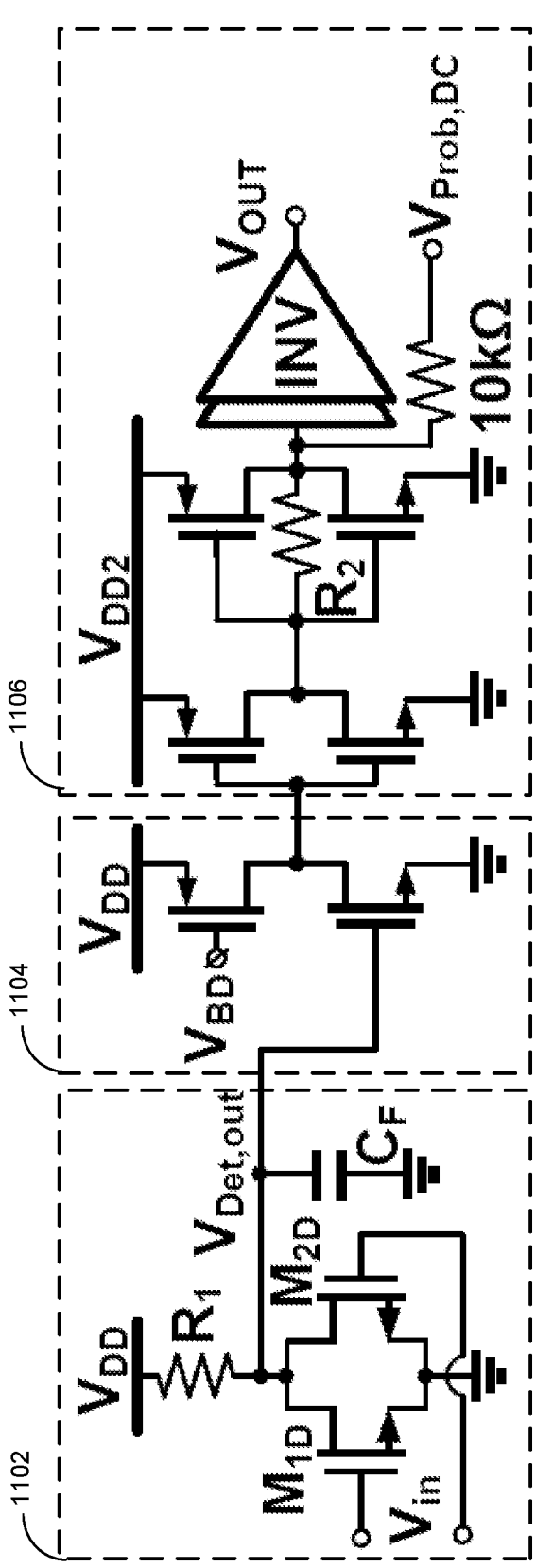
FIG. 11 shows a circuit diagram of an exemplary envelope detector and baseband circuit for the envelope detectors, the baseband amplifiers and the output buffers in FIG. 8 in accordance with the disclosed embodiments.

FIG. 11 shows a circuit diagram of an exemplary envelope detector and baseband circuit for the envelope detectors, the baseband amplifiers and the output buffers in FIG. 8 in accordance with the disclosed embodiments. As can be seen in FIG. 11, the first stage in the circuit diagram is a differential envelope detector 1102 which is an exemplary implementation of envelope detectors 852 and 854 in FIG.

8. Note that the NMOS transistors $M_{1D}$ and $M_{2D}$ within the differential envelope detector 1102 are class AB biased for better sensitivity. The bandwidth of the $R_1$-$C_F$ lowpass network at the output of envelope detector 1102 is designed to be around 25 GHz to allow the recovered data to pass through with minimum ripples. Higher bandwidth helps with the data recovery, but at the same time increases the integrated noise, thus decreasing the SNR.

The circuit 1104 following envelope detector 1102 is used as a voltage level shifter to tune the threshold of the inverter, and to calibrating the receiver for different input power levels. In order to make the receiver dynamically adaptive for different link distances, the LNAs can be designed to have automatic gain control as a function of signal power and hence eliminate the manual threshold tuning of the inverter. The buffer circuit 1106 is used to further amplify and convert the demodulated analog signal into digital signals. The last inverter stage in output buffer 1106 is implemented to drive the 50Ω loading. Additional DC pads with a large resistor are added to the output of the inverter-based amplifiers for characterizing the frequency response of the disclosed 4FSK receiver.

Figure 12A:
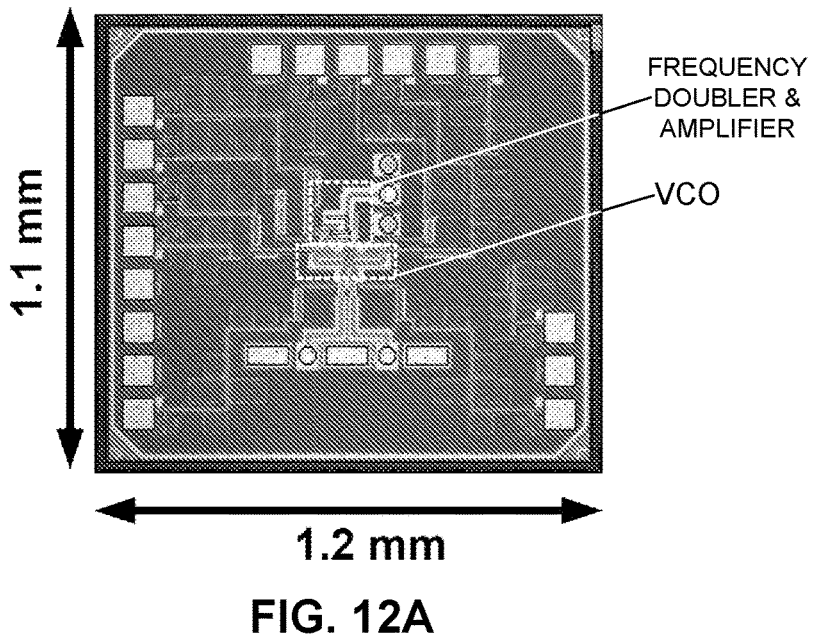
FIG. 12A shows a photograph of a fabricated chip die of a 4FSK transmitter in 65 nm CMOS process in accordance with the disclosed embodiments.
Figure 12B:
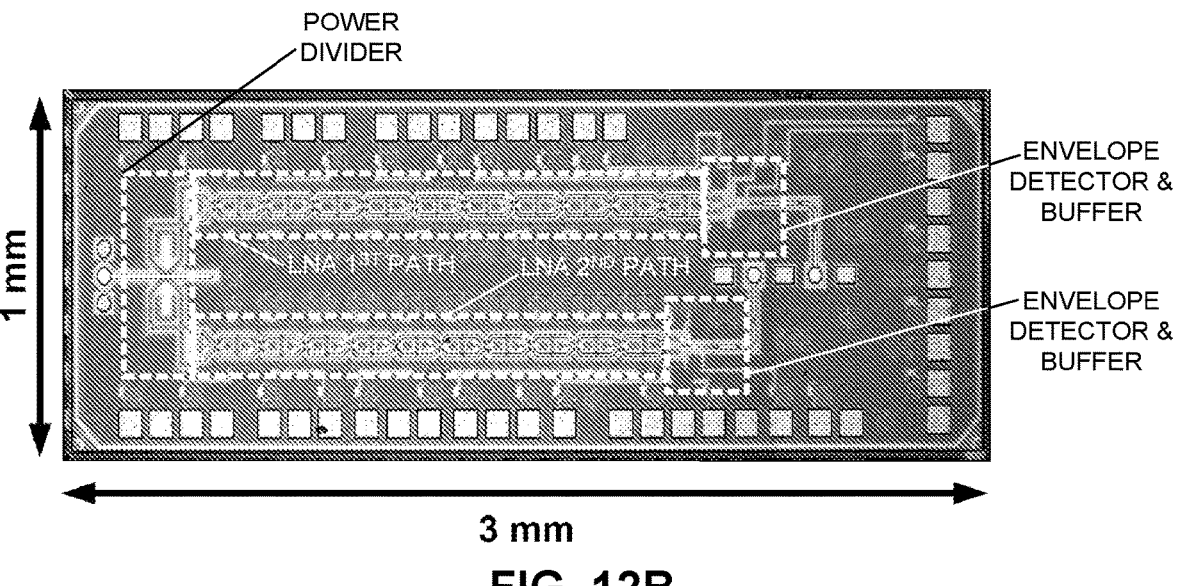
FIG. 12B shows a photograph of a fabricated chip die of a 4FSK receiver in 65 nm CMOS process in accordance with the disclosed embodiments.

In some embodiments, the disclosed 4FSK transmitter (TX) and receiver (RX) circuits are fabricated in a 65 nm CMOS process. Specifically, FIG. 12A shows a photograph of a fabricated chip die 1202 of the disclosed 4FSK transmitter in 65 nm CMOS process in accordance with the disclosed embodiments. As can be seen in FIG. 12A, the chip die 1202 with a die area of ~1.32 mm². FIG. 12B shows a photograph of a fabricated chip die 1204 of the disclosed 4FSK receiver in 65 nm CMOS process in accordance with the disclosed embodiments. As can be seen in FIG. 12B, the chip die 1204 with a die area of ~3 mm².

Conclusion

Due to the scarcity of bandwidth in the radio frequency (RF) and microwave frequency bands, the FSK modulation is rarely used in modern high data rate RF transceivers. However, the large available bandwidths exist at mm-wave and sub-THz bands can be utilized to implement energy-efficient multi-Gb/s communication systems. Theoretically, FSK modulations show better performance in terms of energy efficiency and bit error rate (BER) than PSK/QAM modulations. As such, spectral efficiency can be traded off with energy efficiency and BER performance at mm-wave frequencies using FSK modulations. Moreover, the FSK communication techniques and systems provided herein can be implemented non-coherently without a need for a separate modem. This property eliminates the need for accurate synthesizer, carrier recovery, I/Q mixer, and high-speed data converters and thus, the complexity and power consumption of the 4FSK communication techniques and systems can be further reduced. Furthermore, FSK is a constant envelope modulation and as a result, it can take advantage of high efficiency and non-linear power amplifiers in its implementation. Finally, compared to traditional OOK, the disclosed 4FSK communication techniques and systems can transmit more than one bit per symbol enabling higher data rate systems.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A 4 frequency-shift keying (4FSK) transceiver, comprising:

a transmitter that includes:

a voltage-controlled oscillator (VCO); and two data links coupled to the VCO for delivering two parallel streams of input data bits to the VCO;

wherein, for each pair of parallel input data bits received from the two data links, the VCO outputs a modulated signal having one of four operating frequencies via four frequency-shift keying (4FSK) modulation, thereby producing a multi-frequency modulated signal; and a receiver that includes:

a power divider for dividing the multi-frequency modulated signal into two paths of two binary bit streams;

a pair of low-noise amplifiers (LNAs) separately coupled to the two paths and configured as a pair of band-pass filters for filtering two different subsets of the four operating frequencies from the two binary bit streams into two filtered binary bit streams; and in each of the two paths, a power detector for demodulating the pairs of filtered data bits from the two filtered binary bit streams according to power measurements of the two filtered binary bit streams.

2. The 4FSK transceiver of claim 1, wherein:

the VCO includes two sets of varactors;

each set of varactors is controlled by one of the two streams of input data bits; and a voltage applied to each set of varactors is controlled by each stream of the two streams of input data bits.

3. The 4FSK transceiver of claim 2, wherein the two voltages applied to the two sets of varactors by the two streams of input data bits determine one of the four operating frequencies.

4. The 4FSK transceiver of claim 3, wherein:

the two voltages applied to the two sets of varactors correspond to one of the four permutations of a pair of binary bits; and each permutation of the four permutations corresponds to one of the four operating frequencies.

5. The 4FSK transceiver of claim 4, wherein:

the transmitter further comprises two sets of inverters;

each set of inverters is coupled between one of two streams of input data bits and the corresponding set of varactors; and each set of inverters is configured to convert each received data bit in the given stream of input data bits into either a digital High voltage or a digital Low voltage for controlling the corresponding set of varactors.

6. The 4FSK transceiver of claim 1, wherein the transmitter further comprises a frequency doubler following the VCO and wherein the frequency doubler is configured to double the four operating frequencies generated by the VCO and frequency tuning ranges of the VCO, thereby generating four target frequencies of the 4FSK modulation.

7. The 4FSK transceiver of claim 6, wherein:

the four operating frequencies are 75 GHZ, 80 GHZ, 85 GHZ, and 90 GHz; and the four target frequencies are 150 GHz, 160 GHz, 170 GHz, and 180 GHz.

8. The 4FSK transceiver of claim 6, wherein the transmitter further comprises an amplifier following the frequency doubler and wherein the amplifier is configured to increase an output power of the transmitter and to equalize the powers associated with the four types of modulated signals outputted from the transmitter at the four target frequencies.

9. The 4FSK transceiver of claim 1, wherein the power divider is a slot power divider that further comprises:

a first transmission line configured to receive the multi-frequency modulated signal;

a slot line positioned perpendicular to the transmission line and configured to couple the multi-frequency modulated signal from the transmission line into a second transmission line and a third transmission line equally into two identical multi-frequency modulated signals; and a pair of matching networks, each matching network is coupled to one of the second and the third transmission lines to couple one of the two identical multi-frequency modulated signals to one of two output ports of the slot power divider.

10. The 4FSK transceiver of claim 1, wherein:

the four operating frequencies comprises four equally spaced frequencies f1, f2, f3, and f4 in an ascending order;

the first LNA in the pair of LNAs is configured to pass frequencies f2 and f3 and remove frequencies f1 and f2 from one of the two binary bit streams to generate the first filtered binary bit streams; and the second LNA in the pair of LNAs is configured to pass frequencies f3 and f4 and remove frequencies f1 and f2 from the other one of the two binary bit streams to generate the second filtered binary bit streams.

11. The 4FSK transceiver of claim 10, wherein:

the two different subsets of the four operating frequencies include a common frequency; and the two output spectra of the pair of LNAs overlap each other.

12. The 4FSK transceiver of claim 1, wherein the power detector is configured to demodulate the pairs of filtered data bits by:

generating a (0,0) binary data pair when both the first and the second filtered data bits are simultaneously detected as low power levels;

generating a (1,0) binary data pair when the first and the second filtered data bits are simultaneously detected as high power level and low power level, respectively;

generating a (1,1) binary data pair when both the first and the second filtered data bits are simultaneously detected as high power levels; and generating a (0,1) binary data pair when the first and the second filtered data bits are simultaneously detected as low power level and high power level, respectively.

13. The 4FSK transceiver of claim 12, wherein:

the generated (0,0) binary data pair corresponds to frequency f1 in both the first binary bit stream and the second binary bit stream;

the generated (1,0) binary data pair corresponds to frequency f2 in both the first binary bit stream and the second binary bit stream;

the generated (1,1) binary data pair corresponds to frequency f3 in both the first binary bit stream and the second binary bit stream; and the generated (0,1) binary data pair corresponds to fre-
quency f4 in both the first binary bit stream and the
second binary bit stream.

14. The 4FSK transceiver of claim 13, wherein:

the binary data pairs generated by the power detector are
gray code in relation to the four frequencies f1, f2, f3,
and f4; and demodulating the two filtered binary bit streams addition-
ally includes converting the gray code generated by the
power detector into the binary code associated with the
multi-frequency modulated signal.

15. The 4FSK transceiver of claim 1, wherein:

each data stream of the two parallel streams of input data
bits has a data rate of 8-10 Gb/s; and the two parallel streams of input data bits of the two data
links have a combined data rate of 16-20 Gb/s.

16. The 4FSK transceiver of claim 1, wherein the trans-
mitter and the receiver are used non-coherently without the
need for synchronization between the transmitter and the
receiver.

17. The 4FSK transceiver of claim 1, wherein the trans-
mitter and the receiver can be implemented on the same chip
or on two different chips.

18. A 4 frequency-shift keying (4FSK) transmitter, com-
prising:

a voltage-controlled oscillator (VCO);

two data links coupled to the VCO for delivering two
parallel streams of input data bits to the VCO; and an antenna for radiating a multi-frequency modulated
signal wireless toward a 4FSK receiver;

wherein, for each pair of parallel input data bits received
from the two data links, the VCO outputs a modulated
signal having one of four operating frequencies via four
frequency-shift keying (4FSK) modulation, thereby
producing the multi-frequency modulated signal, and wherein the transmitter further comprises a frequency
doubler following the VCO and wherein the frequency
doubler is configured to double the four operating
frequencies generated by the VCO and frequency tun-
ing ranges of the VCO, thereby generating four target
frequencies of the 4FSK modulation.

19. The 4FSK transmitter of claim 18, wherein:

the VCO includes two sets of varactors;

each set of varactors is controlled by one of the two
streams of input data bits; and a voltage applied to each set of varactors is controlled by
each stream of the two streams of input data bits.

20. The 4FSK transmitter of claim 19, wherein the two
voltages applied to the two sets of varactors by the two
streams of input data bits determine one of the four operating
frequencies.

21. The 4FSK transmitter of claim 20, wherein:

the two voltages applied to the two sets of varactors
correspond to one of the four permutations of a pair of
binary bits; and each permutation of the four permutations corresponds to
one of the four operating frequencies.

22. A 4 frequency-shift keying (4FSK) transmitter, com-
prising:

a voltage-controlled oscillator (VCO);

two data links coupled to the VCO for delivering two
parallel streams of input data bits to the VCO; and an antenna for radiating a multi-frequency modulated
signal wireless toward a 4FSK receiver;

wherein, for each pair of parallel input data bits received
from the two data links, the VCO outputs a modulated
signal having one of four operating frequencies via four frequency-shift keying (4FSK) modulation, thereby
producing the multi-frequency modulated signal, the VCO includes two sets of varactors;

each set of varactors is controlled by one of the two
streams of input data bits; and a voltage applied to each set of varactors is controlled by
each stream of the two streams of input data bits, and
wherein:

the transmitter further comprises two sets of inverters;

each set of inverters is coupled between one of two
streams of input data bits and the corresponding set of
varactors; and each set of inverters is configured to convert each
received data bit in the stream of input data bits into
either a digital High voltage or a digital Low voltage for
controlling the corresponding set of varactors.

23. The 4FSK transmitter of claim 18, wherein:

the four operating frequencies are 75 GHZ, 80 GHZ, 85
GHZ, and 90 GHz; and the four target frequencies are 150 GHz, 160 GHz, 170
GHz, and 180 GHz.

24. The 4FSK transmitter of claim 18, wherein the trans-
mitter further comprises an amplifier following the fre-
quency doubler and wherein the amplifier is configured to
increase an output power of the transmitter and to equalize
the powers associated with the four types of modulated
signals outputted from the transmitter at the four target
frequencies.

25. A 4 frequency-shift keying (4FSK) receiver, compris-
ing:

an antenna for receiving a multi-frequency modulated
4FSK signal generated by a 4FSK transmitter and
transmitted toward the 4FSK receiver, wherein the
multi-frequency modulated 4FSK signal comprises
four operating frequencies associated with a 4FSK
modulation;

a power divider for dividing the multi-frequency modu-
lated 4FSK signal into two paths of two binary bit
streams;

a pair of low-noise amplifiers (LNAs) separately coupled
to the two paths and configured as a pair of band-pass
filters for filtering two different subsets of the four
operating frequencies within the two binary bit streams
into two filtered binary bit streams; and in each of the two paths, a power detector for demodu-
lating the pairs of filtered data bits from the two filtered
binary bit streams according to power measurements of
the two filtered binary bit streams.

26. The 4FSK receiver of claim 25, wherein the power
divider is a slot power divider that further comprises:

a first transmission line configured to receive the multi-
frequency modulated signal;

a slot line positioned perpendicular to the transmission
line and configured to couple the multi-frequency
modulated signal from the transmission line into a
second transmission line and a third transmission line
equally into two identical multi-frequency modulated
signals; and a pair of matching networks, each matching network is
coupled to one of the second and the third transmission
lines to couple one of the two identical multi-frequency
modulated signals to one of two output ports of the slot
power divider.

27. The 4FSK receiver of claim 25, wherein:

the four operating frequencies comprises four equally
spaced frequencies f1, f2, f3, and f4 in an ascending
order;

the first LNA in the pair of LNAs is configured to pass frequencies f2 and f3 and remove frequencies f1 and f2 from one of the two binary bit streams to generate the first filtered binary bit streams; and the second LNA in the pair of LNAs is configured to pass frequencies f3 and f4 and remove frequencies f1 and f2 from the other one of the two binary bit streams to generate the second filtered binary bit streams.

28. The 4FSK receiver of claim 27, wherein:

the two different subsets of the four operating frequencies include a common frequency; and the two output spectra of the pair of LNAs overlap each other.

29. The 4FSK receiver of claim 25, wherein the power detector is configured to demodulate the pairs of filtered data bits by:

generating a (0,0) binary data pair when both the first and the second filtered data bits are simultaneously detected as low power levels;

generating a (1,0) binary data pair when the first and the second filtered data bits are simultaneously detected as high power level and low power level, respectively;

generating a (1,1) binary data pair when both the first and the second filtered data bits are simultaneously detected as high power levels; and generating a (0,1) binary data pair when the first and the second filtered data bits are simultaneously detected as low power level and high power level, respectively.

30. The 4FSK receiver of claim 29, wherein:

the generated (0,0) binary data pair corresponds to frequency f1 in both the first binary bit stream and the second binary bit stream;

the generated (1,0) binary data pair corresponds to frequency f2 in both the first binary bit stream and the second binary bit stream;

the generated (1,1) binary data pair corresponds to frequency f3 in both the first binary bit stream and the second binary bit stream; and the generated (0,1) binary data pair corresponds to frequency f4 in both the first binary bit stream and the second binary bit stream.

31. The 4FSK receiver of claim 30, wherein:

the binary data pairs generated by the power detector are gray code in relation to the four frequencies f1, f2, f3, and f4; and demodulating the two filtered binary bit streams additionally includes converting the gray code generated by the power detector into the binary code associated with the multi-frequency modulated signal.

32. The 4FSK receiver of claim 25, wherein:

each data stream of the two parallel streams of input data bits has a data rate of 8-10 Gb/s; and the two parallel streams of input data bits of the two data links have a combined data rate of 16-20 Gb/s.

33. The 4FSK receiver of claim 25, wherein the receiver is used non-coherently without the need for synchronization with a transmitter that generates and radiates the multi-frequency modulated 4FSK signal.

* * * * *